(12) United States Patent
Sato et al.

(10) Patent No.: US 6,565,254 B2
(45) Date of Patent: May 20, 2003

(54) INFRARED SENSING ELEMENT AND TEMPERATURE MEASURING DEVICE

(75) Inventors: Shigemi Sato, Asahi-mura (JP); Osamu Iwamoto, Chino (JP); Yasuhiro Shiohara, Shojir (JP); Yuji Oda, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/875,343

(22) Filed: Jun. 6, 2001

(65) Prior Publication Data

US 2002/0037026 A1 Mar. 28, 2002

(30) Foreign Application Priority Data

Jun. 6, 2000 (JP) ........................ 2000-169693

(51) Int. Cl.⁷ ............................... G01J 5/12; G01J 5/16

(52) U.S. Cl. ................. 374/132; 374/133; 374/181; 136/224

(58) Field of Search .................... 374/130, 132, 374/133, 181, 182; 136/224; 250/338.1, 338.4, 339.04, 339.03; 600/474

(56) References Cited

U.S. PATENT DOCUMENTS

| | | | | |
|---|---|---|---|---|
| 4,111,717 A | * | 9/1978 | Baxter | 136/208 |
| 4,456,919 A | * | 6/1984 | Tomita et al. | 136/225 |
| 4,722,612 A | * | 2/1988 | Junkert et al. | 136/230 |
| 5,056,929 A | * | 10/1991 | Watanabe et al. | 136/213 |
| 5,150,969 A | * | 9/1992 | Goldberg et al. | 374/128 |
| 5,695,283 A | * | 12/1997 | Johnson | 136/208 |
| 6,043,493 A | * | 3/2000 | Kim et al. | 250/338.1 |
| 6,203,194 B1 | * | 3/2001 | Beerwerth et al. | 136/227 |
| 6,348,650 B1 | * | 2/2002 | Endo et al. | 136/201 |
| 2001/0027274 A1 | * | 10/2001 | Pompei | 600/474 |

FOREIGN PATENT DOCUMENTS

| | | | |
|---|---|---|---|
| EP | 0 618 431 | 10/1994 | |
| EP | 0 999 437 | 5/2000 | |
| JP | 07043215 A | * 2/1995 | ............. G01J/5/02 |
| JP | 11258038 A | * 9/1999 | ............. G01J/1/02 |
| WO | WO 95 22928 | 8/1995 | |

OTHER PUBLICATIONS

Müeller M. et al: "IR–Sensoren: Vielseitig und Kostenguenstig", Elektronik, Franzis Verlag GmbH. Munchen, DE, vol. 47, No. 18, Sep. 1, 1998, pp. 72–75, XP000850245, ISSN: 0013–5658, p. 74, col. 2, paragraph 3.
Najafi K: "Silicon Integrated Microsensors", Integrated Optics and Microstructures. Boston, Sep. 8–9, 1992, Proceedings of the Conference on Integrated Optics and Microstructures, Bellingham, Spie, US, vol. Conf. 1, Sep. 8, 1992, pp. 235–246, XP000700816, ISBN: 0–8194–0972–3, p. 242; figure 7.
Infrared Sensor for Temperature Measurement' by K. Mikami, C. Kimura, C. Shibata New Japan Radio Co., Ltd., No date.

* cited by examiner

Primary Examiner—Christopher W. Fulton
Assistant Examiner—Lydia M. De Jesús
(74) Attorney, Agent, or Firm—Rosalio Haro

(57) ABSTRACT

An infrared sensing element of the present invention includes a base including a thin film portion and a thick wall portion arranged around the thin film portion, and a thermopile including a plurality of thermocouples connected in series so that cold junctions are located on the thick wall portion and hot junctions are located on the thin film portion, wherein a thermosensitive portion is provided in contact with the thick wall portion so that a reference temperature with high accuracy can be used for determining temperature based on output from the thermopile. A PN junction formed on a semiconductor substrate serves as the thermosensitive portion, and it is used to provide for a compact infrared sensing element with high performance at low cost.

23 Claims, 26 Drawing Sheets

INFRARED SENSING ELEMENT AND TEMPERATURE MEASURING DEVICE

BACKGROUND OF THE INVENTION

1. Technical Field

The present invention relates to a thermopile infrared sensing element and a temperature measuring device using the same.

2. Description of the Related Art

A known temperature measuring device uses an infrared sensing element which detects infrared radiation emitted from a heat source and converts it into an electric signal. Examples of known infrared sensing elements include a thermopile type, a pyroelectric type, a borometer, and the like. The thermopile infrared sensing element utilizes the Seebeck effect of a thermopile comprising a thermocouple or a plurality of thermocouples connected in series, for detecting a temperature change due to infrared radiation or absorption as thermo electromotive force. The pyroelectric infrared sensing element detects a temperature by using a change in floating charge due to polarization according to the infrared thermal energy, i.e. a pyroelectric effect, of a base material comprising ceramic or the like. The borometer comprises a thermosensitive resistor comprising a thin film or a thin wire of a metal or the like so that a thermal change in resistance value of the resistor is detected.

Of these sensing elements, the pyroelectric infrared sensing element requires a shutter provided on an optical path, for alternately measuring the temperatures of a surface to be measured and a reference point because polarization occurs only at the moment of application of thermal energy. Therefore, it is difficult to miniaturize the pyroelectric infrared sensing element and improve measurement accuracy. The pyroelectric infrared sensing element can thus be used for applications such as a "body sensing element" of an automatic door and the like, which are little required to have a small size or high measurement accuracy. However, the pyroelectric infrared sensing element is unsuitable for a temperature measuring device such as a clinical thermometer or the like, which is required to measure temperatures with high accuracy and have a small size and low cost.

Furthermore, the pyroelectric and thermopile infrared sensing elements require detecting a relative temperature difference from a reference temperature, while the borometer has the advantage that an absolute temperature can be measured. However, the barometer has many causes of error, such as self heating due to measuring current, current noise, etc., thereby causing difficulties in improving the measurement accuracy. The barometer also requires a bias current that complicates the structure, and thereby complicates handling.

On the other hand, the thermopile infrared sensing element does not use such a transient phenomenon as utilized by the pyroelectric type and such excess measuring current as flowing through the barometer, and thus the thermopile infrared sensing element can stably detect or measure temperatures. Furthermore, the thermopile infrared sensing element can be miniaturized by using the semiconductor manufacturing process at low cost, and is thus suitable for a temperature measuring device such as a clinical thermometer or the like, which is required to be small in size and inexpensive.

FIG. 21 shows an ear-type clinical thermometer 100 as a temperature measuring device using a thermopile infrared sensor or infrared sensing element. The ear-type clinical thermometer 100 comprises a body case 11, an infrared receiving sensing unit 200 which receives infrared radiation from the ear to output a voltage signal according to the temperature of the ear, i.e. the temperature of the tympanic membrane, and a circuit board 3 on which various electronic parts and circuits are mounted. On the circuit board 3, various electronic parts 4C are mounted to form a temperature deriving circuit 400 for determining the temperature of the tympanic membrane based on the output voltage of the infrared receiving sensing unit 200, or the body temperature based on the temperature of the tympanic membrane. Furthermore, LCD 5 for displaying the determined temperature, and the like, and a power source 6 for supplying electric power to each of the units are also mounted on the circuit board 3.

The infrared receiving sensing unit 200 comprises a case 211 having a cylindrical shape which projects forward (to the right of the drawing) to permit the front end to be inserted into the lughole, a wave guide 206 contained in the case 211, and an infrared sensing chip 210 arranged at the base of the wave guide 206 to face the front end of the case 211. The front end of the case 211 is open, and covered with an infrared transmitting probe cap 25, and the front opening of the wave guide 206 is covered with an infrared transmitting film 23 for preventing entrance of dust particles, etc, the film 23 being supported by a film holding O-ring 24. Therefore, when the front end of the case 211 is inserted into the lughole, infrared radiation entering the infrared receiving sensing unit 200 is guided to the infrared sensing chip 210 by the wave guide 206 so that the infrared sensing chip 210 receives the infrared radiation corresponding to the temperature of the tympanic membrane to output a voltage signal according to the infrared radiation. Therefore, when a temperature measurement switch SW4 of the ear-type clinical thermometer 100 is pushed, the body temperature can be measured by the infrared receiving sensing unit 200 through infrared radiation.

Namely, the clinical thermometer 100 is a wave guide type in which infrared radiation entering from a heat source (the lughole) S is transmitted through the wave guide 206 arranged in front of the infrared sensing chip 210 to be guided to the infrared sensing chip 210, as shown in FIG. 22. The temperature rise due to the infrared radiation is converted into a voltage by the thermopile of the infrared sensing chip 210 and then output.

FIG. 23 shows the infrared sensing chip 210. The infrared sensing chip 210 comprises a thermopile infrared sensor 209, and a thermistor 211, both of which are mounted on a package substrate 212. In the infrared sensing chip 210, the thermistor 211 is used for determining the reference temperature of the thermopile formed in the infrared sensor 209, i.e. the temperature of the cold junction. These components are contained in a package case 213 to unify the components. The package case 213 further comprises an infrared filter 208 composed of silicon or the like and provided in a window through which infrared radiation enters, for cutting-off visible light and transmitting infrared radiation.

FIG. 24 is a perspective view schematically showing the infrared sensor or infrared sensing element 209. The infrared sensor 209 comprises a base 80 comprising a portion (thin film portion) 802 in which only a thin film is left by etching a silicon substrate to form a hollow at the center of the lower surface or the bottom of the silicon substrate, and a thick wall portion 801 in which the silicon substrate remains unetched. Namely, the infrared sensor 209 has a structure in which a hollow portion KW is formed at the center of the base 80 from the lower side to form a membrane at the top of the base 80. Furthermore, gold black is deposited at the top of the thin film portion 802 by sputtering, evaporation, or the like to form an infrared absorber 81 comprising a black body for absorbing infrared radiation. The infrared absorber 81 absorbs infrared radiation to cause a change in temperature.

The infrared sensor 209 further comprises a plurality of thermocouples 82 with high sensitivity, which are provided on every side of the infrared absorber 81. The hot junction 83 of each of the thermocouples 82 is arranged near the infrared absorber 81 or to be overlapped with it, and the cold junction 84 of each thermocouple 82 is arranged in the peripheral thick wall portion 801 in which the silicon substrate remains. Although electromotive force occurs between the hot junction 83 and the cold junction 84 of each thermocouple 82 according to a temperature rise of the infrared absorber 81, the electromotive force produced by a single thermocouple 82 is not sufficient. Therefore, the infrared sensor 209 comprises a plurality of thermocouples 82 which are connected in series to form a thermopile 85 so that a voltage between both ends serving as a terminal (for example, +terminal) 86 and a terminal (for example, −terminal) 87 can be output.

More specifically, as shown in FIG. 25, each of the thermocouples 82 comprises two types of conductors of aluminum (Al) 91 and polysilicon (Si—P) 92. The polysilicon 92 is deposited in a line shape. The end of each of the polysilicon conductors 92, which is arranged near the infrared absorber 81, i.e. which is arranged in the thin film portion 802, is joined to the aluminum wiring 91 to form the hot junction 83. On the other hand, the end of each polysilicon conductor 92, which is arranged in the thick wall portion 801 functioning as a heat sink, is joined to the aluminum wiring 91 to form the cold junction 84. Each aluminum wiring 91 connects the hot junction 83 and the cold junction 84 of the adjacent polysilicon conductors 92, resulting in a state where the thermocouples 82 are connected in series.

FIG. 26 is a block diagram schematically showing the functional configuration of the ear-type clinical thermometer 100. The ear-type clinical thermometer 100 comprises the temperature deriving circuit 400 to which a temperature sensing voltage Vt, across both terminals 86 and 87 of the thermopile 85 of the infrared sensor 209, is input to produce a temperature value T (based on the voltage Vt) applied to the LCD 5. The temperature deriving circuit 400 comprises an amplifier 41 for amplifying the temperature sensing voltage Vt, an A/D converter 42 for converting the output from the amplifier 41 to a digital value, CPU 44 for performing numerical processing of the digital value to determine the temperature corresponding to the temperature sensing voltage Vt, and RAM 43 serving as a working area for each processing in the CPU 44. The temperature deriving circuit 400 detects the electromotive force produced between the hot junctions 83 and the cold junctions 84 of the thermopile 85 of the infrared sensor 209 according to a change in temperature to determine the temperature difference □T between the hot junctions 83 and the cold junctions 84 based on the output voltage Vt. In order to determine the temperature of the infrared absorber 81 to calculate the body temperature T (herein, the temperature of the tympanic membrane), the temperature (reference temperature) of the cold junctions 84 must be determined for correction.

Therefore, the infrared sensing chip 210 contains the thermistor 211 so as to detect the reference temperature Tr of the infrared sensor 209. The temperature deriving circuit 400 further comprises an amplifier 45 for amplifying the output current It of the thermistor 211, and an A/D converter 46 for converting the output to a digital value to supply a digital signal to the CPU 44. The CPU 44 can thus correct the temperature difference □T obtained by the signal from the thermopile 85 with the reference temperature Tr obtained by the thermistor 211 to determine the body temperature T.

However, as shown in FIG. 23, the thermistor 211 simply measures the temperature on the side of the infrared sensor 209, i.e. the environmental temperature around the infrared sensor 209 within the infrared detecting chip 210. Therefore, the temperature detected by the thermistor 211 is different from the actual temperature of the cold junctions 84, thereby possibly causing great error in the body temperature T determined as described above.

The thermistor 211 is apparently suitable for measuring the reference temperature in view of the fact that the absolute temperature can be measured because the resistivity changes with temperature. However, the temperature characteristic is nonlinear, and thus an appropriate compensating circuit is required. Also, the range of precise temperature measurement is limited. Therefore, in use of the ear-type clinical thermometer 100, the range of room temperature which permits precise measurement is possibly limited, and thus the body temperature cannot be always easily measured with high accuracy depending upon the environment of measurement.

Accordingly, an object of the present invention is to provide an infrared sensing element and a temperature measuring device using the same which permit an improvement in accuracy of temperature measurement when the temperature is measured by using the above-described thermopile infrared sensing element. Another object of the present invention is to provide an infrared sensing element and a temperature measuring device using the same which permit temperature measurement with ease and high accuracy under any environment.

SUMMARY OF THE INVENTION

An infrared sensing element of the present invention comprises a base comprising a thin film portion and a thick wall portion arranged around the thin film portion, a thermopile comprising a plurality of thermocouples connected in series so that the cold junctions thereof are located at the top of the thick wall portion, and the hot junctions thereof are located at the top of the thin film portion, and reference temperature sensing means provided with a thermosensitive portion in contact with the thick wall portion. In the infrared sensing element of the present invention, the thermosensitive portion is arranged in contact with the thick wall portion of the base, which serves as a heat sink of the thermopile. Therefore, the temperature of the thick wall portion in contact with the cold junctions of the thermopile can be detected directly by the thermosensitive portion, and thus the temperature of the cold junctions can be detected substantially accurately even when the environment around the infrared sensing element changes.

Therefore, a temperature measuring device comprising the infrared sensing element of the present invention, and means for determining temperature from the output voltage of the thermopile based on the reference temperature determined by the reference temperature sensing means is capable of measuring temperature with high accuracy. The infrared sensing element of the present invention is a thermopile infrared sensing element, and permits mass-production of small size elements at low cost by utilizing a semiconductor manufacturing process. Therefore, by using the infrared sensing element of the present invention, a compact temperature measuring device can be provided at low cost, which can measure temperature with high accuracy.

Even when the thermosensitive portion comprises a thermistor, the accuracy of the reference temperature is improved to improve the accuracy of temperature measurement. However, it is difficult to incorporate the thermistor in contact with the base. On the other hand, a PN junction, for example, a diode, can be incorporated into a semiconductor substrate, and used as the thermosensitive portion because a forward voltage drop substantially linearly changes depending upon temperature. Therefore, the base of at least the thick wall portion of the base preferably comprises a semiconductor substrate so that the thermosensitive portion comprises the PN junction formed on the semiconductor substrate. As a result, an infrared sensing element comprising a compact thermosensitive portion can be formed. Also, like the thermopile, the thermosensitive portion can be formed by the semiconductor process, thereby decreasing the manufacturing cost.

Furthermore, in the thermistor, the temperature characteristic nonlinearly changes, and thus the range of temperature measurement is limited, thereby causing the restriction that the body temperature cannot be accurately measured by a conventional clinical thermometer using a thermistor unless the room temperature is about 15° C. or more. In contrast, by using the PN junction as the thermosensitive portion, the temperature can be easily measured in any place at any time independently of the environment because the temperature characteristic is linear. Therefore, the infrared sensing element of the present invention comprises the PN junction as the thermosensitive portion, and temperature determining means include means for determining the reference temperature based on the forward voltage drop of the PN junction, whereby a compact temperature measuring device with high measurement accuracy within a wide temperature range can be provided at low cost.

By providing a plurality of PN junctions as the thermosensitive portion, the influence of a reverse saturation current on a forward voltage drop can be canceled by determining a difference between the forward voltage drops of these PN junctions. Therefore, the temperature can be more accurately determined, thereby improving the measurement accuracy of the reference temperature, and the accuracy of temperature measurement by the infrared sensing element of the present invention. Therefore, the infrared sensing element of the present invention comprises a plurality of PN junctions as the thermosensitive portion, and temperature determining means include means for determining the reference temperature based on the difference between the forward voltage drops of the plurality of PN junctions, whereby a temperature measuring device with higher measurement accuracy can be provided.

Although the plurality of PN junctions may be arranged in any portion of the semiconductor substrate, the PN junctions are preferably arranged in parallel near the semiconductor substrate in order to prevent differences in characteristic between the PN junctions. The parallel arrangement of the PN junctions enables the use of a common conductor layer as the conductor layers on one side in the plurality of PN junctions, thereby improving the space efficiency and decreasing the number of electrodes. Therefore, the infrared sensing element of the present invention can be further decreased in size. For example, in use of a plurality of diodes, a single anode region, and a plurality of cathode regions extending in parallel to the anode region can be provided.

Furthermore, the PN junction can be formed below each of the cold junctions to bring the thermosensitive portion nearer to the cold junction, whereby the reference temperature can be more correctly detected. It is thus possible to further improve the accuracy of temperature measurement. Where a plurality of PN junctions having a plurality of cold junctions arranged to form the thermopile are formed along the periphery of the thin film portion, the average reference temperature of the cold junctions can be obtained, thereby obtaining the more accurate reference temperature and improving the accuracy of temperature measurement. In forming such a long PN junction, electrodes are preferably respectively formed on the upper surfaces of first and second conductor layers of the PN junction so as to extend along the first and second conductor layers, thereby decreasing a potential difference in the same conductor as much as possible.

Furthermore, a second substrate may be provided on the thick wall portion of the base to be joined to the thick wall portion, and the thermosensitive portion may be provided on the base and/or the second substrate at the junction between the a base and the second substrate. When the second substrate comprises an infrared lens or wave guide, the temperature of the infrared lens or wave guide can be obtained at the same time as detection of the reference temperature. Therefore, temperature correction for lens characteristics or light collecting characteristics can be made to improve the measurement accuracy.

When the second substrate comprises a semiconductor substrate, the PN junctions can be formed on the junction of the second substrate to form the thermosensitive portion. It is thus possible to measure the reference temperature with the thermosensitive portion in direct contact with the thick wall portion of the base, and save the space for arranging the thermosensitive portion on the base side, further decreasing the size of the infrared sensing element. Particularly, the infrared lens or a substrate joined to the infrared lens is suitable for the second substrate. The infrared lens can efficiently guide the infrared radiation emitted from the heat source to the thin film portion where the hot junctions of the thermopile are arranged at the top thereof, and limit the angle of incidence of the infrared radiation received by the thin film portion. Therefore, the sensitivity of temperature measurement can be improved. Also, the influence or interference of infrared radiation due to external heat can be decreased by joining the infrared lens to the thick wall portion of the base. Therefore, in use of the infrared lens, the infrared lens is preferably joined to the base to decrease factors of error, thereby further improving the measurement accuracy. Furthermore, as described above, the junction of the infrared lens is used as the space for the thermosensitive portion, whereby the element can be made compact to decrease the measurement error due to the temperature difference between the reference temperature and the lens temperature.

In order to improve the sensitivity of temperature measurement, the infrared absorber is preferably laminated on the thin film portion to cover at least the hot junctions or the vicinities thereof. With the infrared absorber provided, the infrared absorber absorbs infrared radiation to increase the temperature, thereby increasing the temperature difference between the thin film portion and the thick wall portion, and increasing the output voltage of the thermopile. As a result, the sensitivity of temperature measurement can be further improved. This is thus effective for use of the infrared lens.

Since the infrared lens can be formed by etching a semiconductor substrate, the infrared lens itself may be used as the second substrate, or a junction substrate comprising a semiconductor substrate may be held as the second substrate between the infrared lens and the base. In any case, the PN junction can be provided at the junction to form the thermosensitive portion, providing the compact infrared sensing element enabling an improvement in accuracy of temperature measurement. In forming the PN junction at the junction, a plurality of PN junctions are preferably arranged in parallel as described above. In this case, a common conductor layer is formed for the plurality of PN junctions to make the sensing element further compact. Also, the PN junctions are formed above the cold junctions to permit the measurement of the reference temperature with higher accuracy. When the junction is formed along the periphery of the thin film portion, the PN junctions are formed at the junction or a junction adjacent thereto to improve the measurement precision of the reference temperature. In this case, electrodes are preferably respectively formed in contact with the upper surfaces of the first and second conductor layers of each PN junction so as to extend along the first and second conductor layers at the junction or the base or the semiconductor substrate of the base which is opposed to the junction.

On the other hand, in order to improve the temperature measurement accuracy of the thermopile, it is preferable to decrease the amount of heat conduction between the hot and cold junctions to secure the large temperature difference between both junctions. Therefore, a hole passing through the thin film portion or a recess is preferably provided between the electrodes or conductors, which constitute each thermocouple, to further thin the thin film portion, decreasing the cross section of the thin film portion between the hot and cold junctions. Furthermore, the conductors which constitute each thermocouple, and the conductors for connecting the thermocouples in series are laminated on the thin film portion to increase the area of the thin film portion, which can be cut off by the hole or slit, or which can be thinned, thereby further decreasing the amount of heat conduction. It is effective to also form a hole in each of the conductors for connecting the hot and cold junctions to decrease the amount of heat conduction, or further thin the conductor. Thus, the large temperature difference between both junctions can be maintained, and the electromotive force of each thermocouple can be increased, improving the measurement sensitivity. Furthermore, such a hole or slit can easily be formed by using the semiconductor manufacturing process, without deteriorating the productivity of the infrared sensing element. By using the infrared sensing element of the present invention, a compact temperature measuring device can be provided at low cost, which can easily accurately measure temperatures at any time in any place independently of environment. Therefore, the temperature measuring device of the present invention is suitable as a clinical thermometer, and an ear-type clinical thermometer with high accuracy and ease of handling can be provided at low cost, in which a cylindrical portion is provided at the front end so that it can be inserted into the lughole, and the infrared sensing element is provided so that the thin film portion faces the front end of the cylindrical portion. In the infrared sensing element comprising the infrared absorber laminated thereon, the infrared absorber is preferably arranged to face the front end of the cylindrical portion.

DESCRIPTION OF THE PREFERRED EMBODIMENTS z

Figure 1:
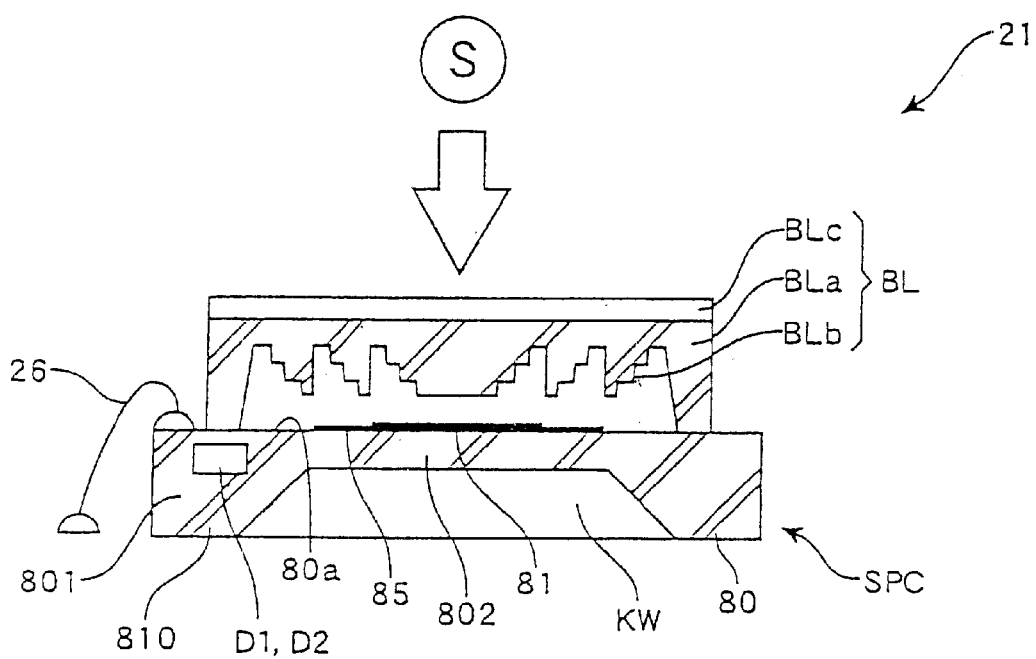
FIG. 1 is a drawing schematically showing an infrared sensing element of the present invention.

For the sake of simplicity in the following descriptions, elements having a similar functionality as elements of FIGS.

21–26 are given similar reference numerals. It is to be understood, however, that in spite of having similar reference numerals as some of the elements recited above, the below recited elements are different embodiments and thus have different structures, as noted below.

An infrared sensing element of the present invention will be described in detail below with reference to the drawings. FIG. 1 is a section showing an infrared sensing element in accordance with an embodiment of the present invention. An infrared sensing element 21 of this embodiment comprises a thermopile chip SPC comprising a thermopile 85 and an infrared absorber 81 which are formed on the upper surface 80a of a base 80, and a binary lens BL functioning as an infrared lens, the binary lens BL being integrated with the thermopile chip SPC by junction so that it can be handled as one chip. Therefore, the infrared sensing element 21 of this embodiment is referred to as the "infrared sensing chip" in some cases. A bonding wire 26 is connected to the thermopile chip SPC to receive output of diodes D1 and D2 formed on the thermopile 85 and the base 80 so that the temperature of a heat source such as the tympanic membrane can be measured.

The binary lens BL functions as a lens for concentrating infrared radiation on the infrared absorber 81 comprising a black body in the thermopile chip SPC. Therefore, the binary lens BL comprises a binary element BLb having a multi-step structure formed by etching one side of a semiconductor substrate BLa of silicon (Si) or germanium (Ge). The binary lens BL is joined to the base 80 so that the surface having the binary element BLb formed thereon faces the surface 80a or main surface of the thermopile chip SPC, which has the infrared absorber 81 formed thereon.

Like the above-described infrared filter 208, the binary lend BL can also function as an infrared filter for cutting off visible light and transmitting infrared light from the viewpoint of the composition. In order to cut off near infrared radiation, etc. to narrow the wavelength region of transmission, an infrared coating BLc comprising a multi-layer film of zinc sulfide (ZnS) and germanium (Ge) can be provided on the surface opposite to the binary element BLb. The binary lens BL can efficiently concentrate infrared radiation on the thermopile chip SPC. FIG. 1 shows the multi-step structure of the binary element BLb, which is exaggerated for the sake of ease of understanding.

The thermopile chip SPC of this embodiment comprises a hollow portion KW formed by removing the central portion of the bottom of a silicon substrate 810 which forms the base 80, a thin film portion 802 comprising only a thin film remaining at the top of the hollow portion KW, and a thick plate or thick wall portion 801 in which the silicon substrate 810 remains unetched to form a state referred to as a "membrane structure". Namely, the thin film portion 802 has a structure supported by the hollowed silicon substrate 810. The infrared absorber 81 is formed on the upper surface of the thin film portion 802 by depositing gold black by a sputtering, evaporation process or the like. The thick wall portion 801 in which the silicon substrate 810 remains comprises the two diodes D1 and D2 for detecting the reference temperature of the thermopile 85.

Figure 2:
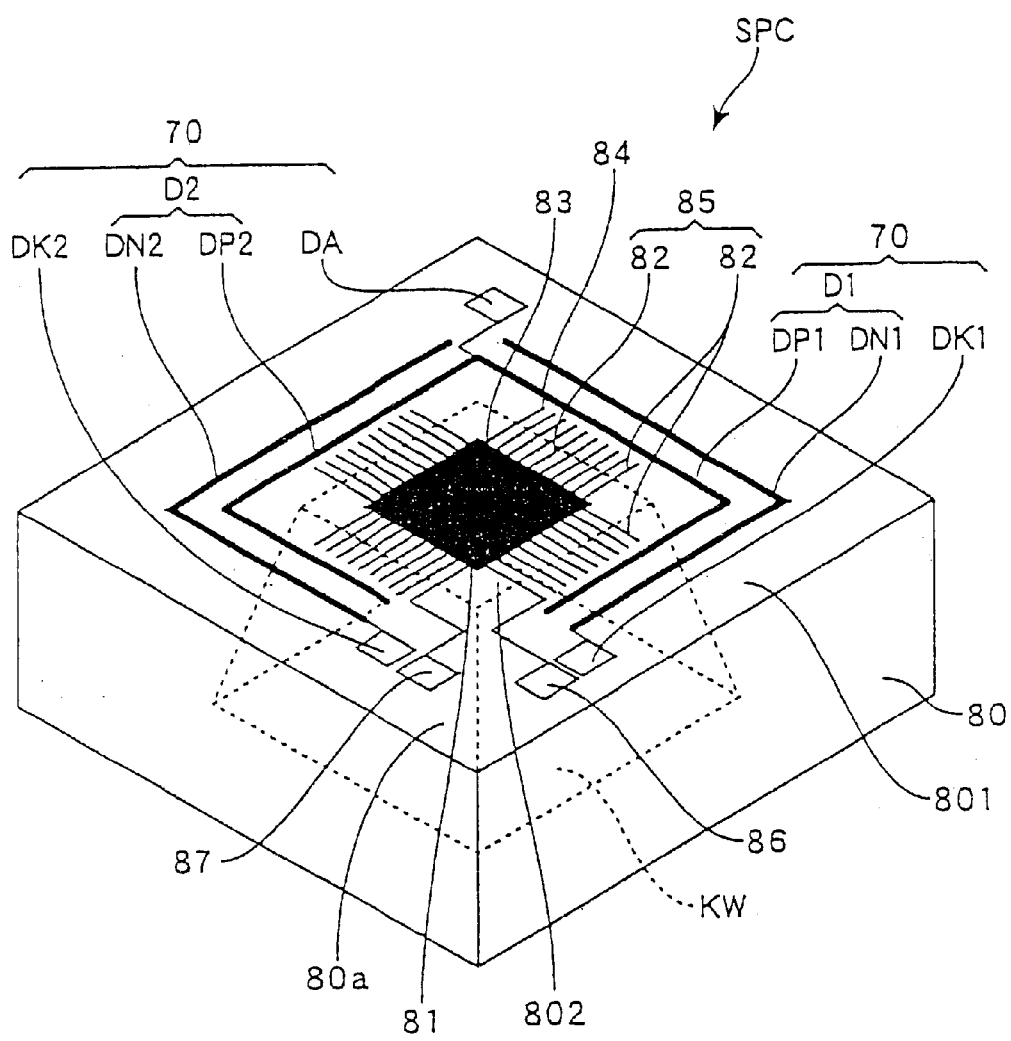
FIG. 2 is a perspective view of a thermopile chip of the infrared sensing element shown in FIG. 1.
Figure 3:
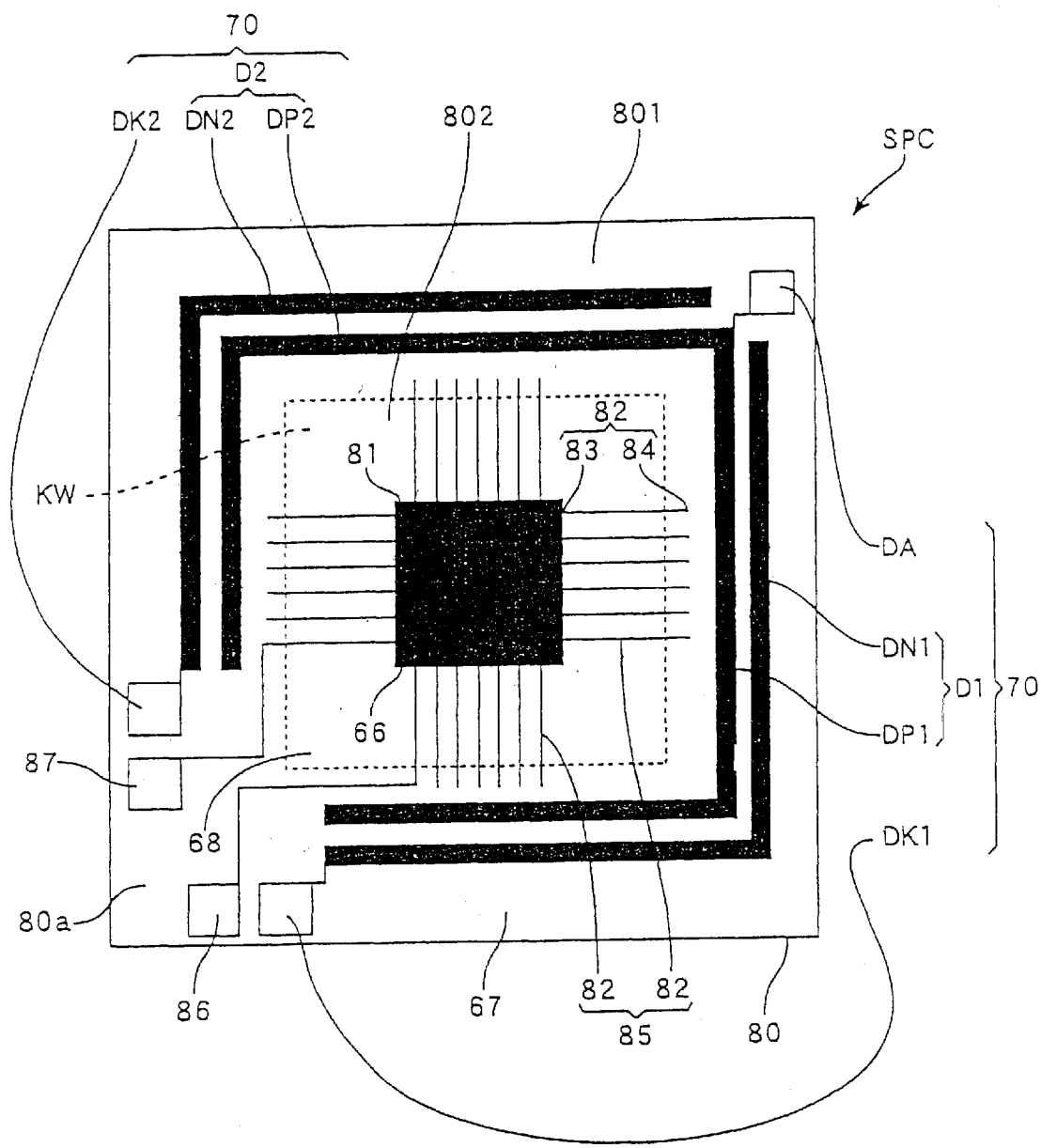
FIG. 3 is a plan view showing the construction on the main surface of the thermopile chip shown in FIG. 2.

FIG. 2 is a perspective view showing the thermopile chip SPC, and FIG. 3 is an enlarged view of the construction on the main surface 80a of the thermopile SPC. The infrared absorber 81 having substantially a square and flat shape is provided on the thin film portion 801 at the center of the main surface 80a of the thermopile chip SPC, and the hot junctions 83 of highly-sensitive thermocouples 82 are arranged near the infrared absorber 81 or to be overlapped with the infrared absorber 81. On the other hand, the cold junctions 84 of the thermocouples 82 are provided on the thick wall portion 801 in which the silicon substrate 810 remains. In the thick wall portion 801, a large amount of silicon having high thermal conductivity remains, and thus the silicon substrate 810 functions as a heat sink of the cold junctions 84. Therefore, each of the thermocouples 82 produces electromotive force between the hot junction 84 and the cold junction 83 according to the temperature rise of the infrared absorber 81. However, each of the thermocouples 82 does not produce sufficient electromotive force, and thus a plurality of the thermocouples are connected in series to form the thermopile 85. The terminals 86 and 87 provided on the main surface 80a serve as output terminals of the thermopile 85, and the potential difference between the hot and cold junctions of the thermopile 85 can be obtained as a voltage between both terminals.

As shown in FIG. 3, the structure of the thermopile chip SPC of this embodiment can be considered as being divided into a hot junction supporting region 66 for supporting the hot junctions 83 and the infrared absorber 81, a cold junction supporting region 67 for supporting the cold junctions 84, and an intermediate supporting region 68 for connecting the regions 66 and 67 and supporting conductors 91 and 92. In the thermopile chip SPC of this embodiment, the thin plate or thin film portion 802 constitutes the hot junction supporting region 66 and the intermediate supporting region 68, while the thick plate or thick wall portion 801 constitutes the cold junction supporting region 801. In order to form the thick wall portion 801 and the thin film portion 802, the hollow portion KW is formed at the back of the base 80.

The hollow portion KW decreases heat conduction as compared with a case in which a heat conducting medium is present. The hollow portion KW can also be said to have a heat insulating function. Therefore, the hollow portion KW can decrease the amount of heat conduction from the infrared absorber 81 and the hot junctions 83, which are located in the hot junction supporting region 66, to the cold junctions 84, to maintain the temperature difference between the hot junctions 83 and the cold junctions 84. Therefore, the electromotive force of each of the thermocouples 82, which constitute the thermopile 85, can be increased to improve the sensitivity of temperature measurement. The hollow portion KW can be formed by forming an oxide film (SiO), nitride film (SiN), and the like having low heat conductivity on the silicon substrate 810 having high heat conductivity, and then removing a portion of the silicon substrate 810 ranging from the back to the thin film portion 802 by an etching step of a general semiconductor manufacturing process.

Therefore, the shape of the thermopile chip SPC of this embodiment can easily be formed by the semiconductor manufacturing process. As described above, where the thin film portion 802 which constitutes the hot junction supporting region 66 and the intermediate supporting region 68 comprises a structural layer with low heat conductivity, such as an oxide film and nitride film, the amount of heat conduction of the thin film portion 802 can also be decreased. On the other hand, the thick wall portion 801 which constitutes the cold junction supporting region 67 mainly comprises the silicon substrate 810, and thus the remainder of the silicon substrate 810 functions as the heat sink because silicon has high heat conductivity. Therefore, the temperature of the hot junction supporting region 66 is increased by infrared radiation, while the cold junctions 84 are maintained at the environment temperature, thereby securing the large temperature difference between the hot junctions 83 and the cold junctions 84 to increase the electromotive force of each thermocouple 82.

Furthermore, in the thermopile chip SPC of this embodiment, even when the infrared absorber 81 receives infrared radiation from the heat source at a temperature of as high as about 500° C. relative to the reference temperature, the short-term temperature rise of the infrared absorber 81 is as small as about 1° C. or less. Therefore, in view of measurement from below-freezing temperature up to 1000° C. or more, the temperature of the thermopile chip SPC itself changes little, and thus deformation or deterioration accompanying these temperature changes are also small. Therefore, the thermopile chip SPC has the advantage that it deteriorates less than an infrared sensor, and stable measurement can be made over a long period of time. On the other hand, in order to rapidly detect a small temperature change, the responsiveness must be improved to increase sensitivity. Particularly, in an application such as a clinical thermometer or the like, which is required to rapidly measure a small temperature change or temperature region, the sensitivity must be improved. Furthermore, in order to enable measurement of the body temperature of a baby or young child, the body temperature must be measured within a time in which the baby or young child can endure an uncomfortable state. In consideration of these applications, the thermopile chip SPC is preferably provided, in which sensitivity is improved as much as possible to permit measurement within a short time.

Figure 4:
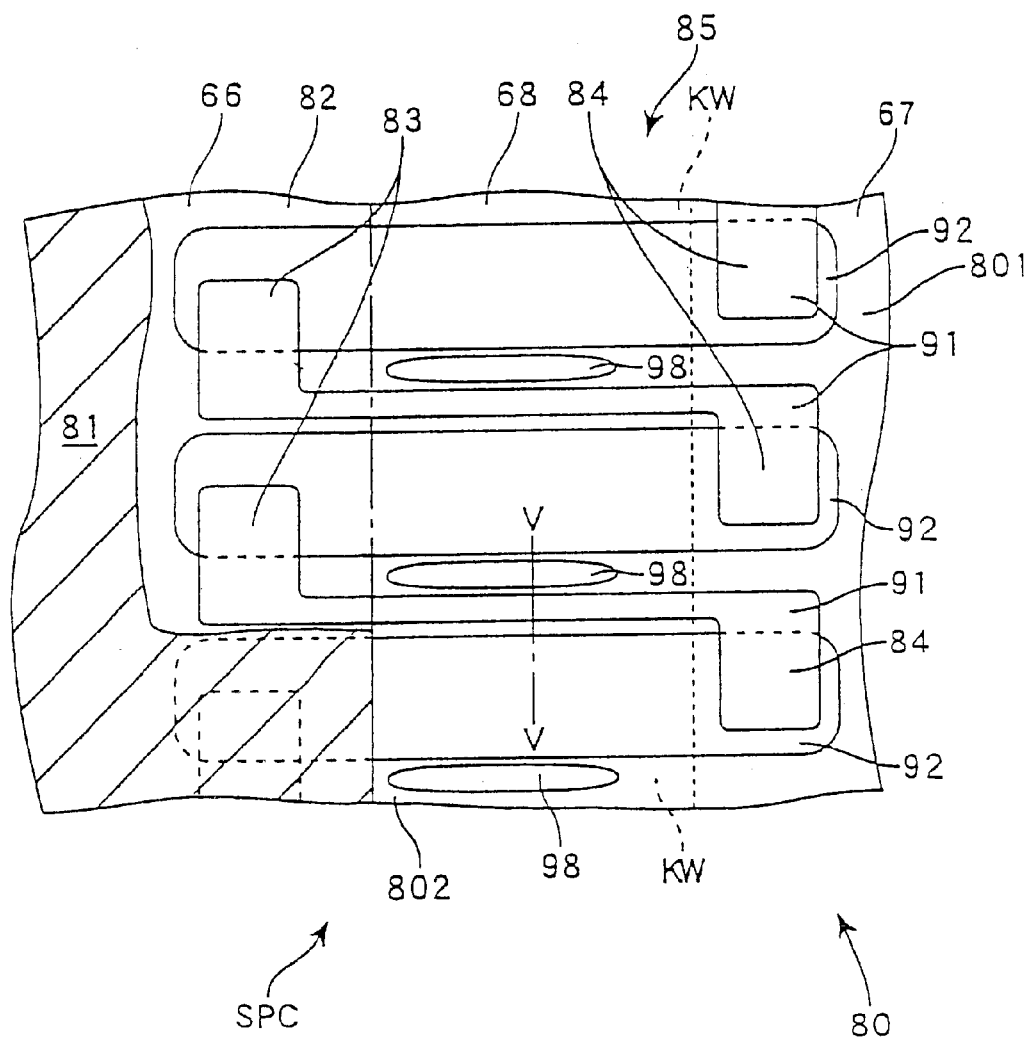
FIG. 4 is a plan view showing slits formed in the thermopile chip shown in FIG. 2.

As shown in FIG. 4, therefore, in the thermopile chip SPC of this embodiment, a plurality of the thermocouples 82 are connected in series to form the thermopile 85 in order to improve sensitivity, thereby securing large electromotive force. Each of the thermocouples 82 comprises two types of conductors including a first conductor of polysilicon (Si—P) 92 and a second conductor of aluminum (Al) 91. The polysilicon conductors 92 are formed in a line pattern to extend from each side of the infrared absorber 81. The infrared absorber side end of one of the adjacent polysilicon conductors 92 is electrically connected to the thick wall portion side end of the other polysilicon conductor 92 by the aluminum conductor 91 to form the hot junction 83 on the infrared absorber 81 side and the cold junction 84 on the thick wall portion 801 side. Furthermore, these thermocouples 82 are connected in series to form the thermopile 85.

In a thermopile infrared sensor, in order to improve sensitivity, it is important to increase the temperature of the hot junction portion of the thermopile as much as possible, and bring the cold junction portion as near to the measurement environmental temperature as possible, thereby securing the temperature difference between both junctions. This is because electromotive force of each of the thermocouples, i.e. the potential difference between both junctions of each thermocouple, can be increased. However, the length of each thermocouple is preferably decreased for decreasing the size of the thermopile chip SPC, and thus the distance between the cold junction and the hot junction is decreased to make it difficult to secure the temperature difference. Therefore, in the thermopile chip SPC of this embodiment, in order to increase the sensitivity of temperature measurement while decreasing the size of the thermopile chip SPC, slits 98 are provided in the intermediate supporting region 68 for supporting the conductors 91 and 92, which constitute the thermocouples 82, i.e. between a pair of the conductors 91 and 92 of each thermocouple 82 and the conductors 91 and 92 of the adjacent thermocouples 82 in the thin film portion 802, so that the slits 98 communicate with the hollow portion KW on the back side from the main surface 80a. In this embodiment, the slits are formed to extend in parallel to the conductors 92.

Figure 5:
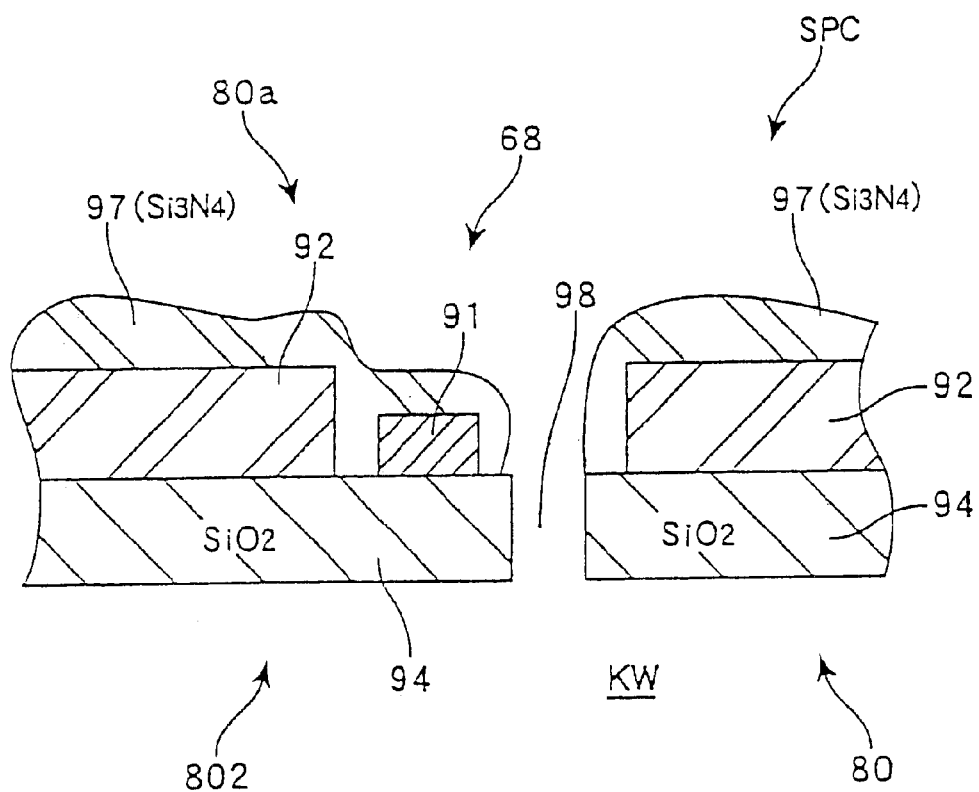
FIG. 5 is a partial cross-sectional view along line V—V of FIG. 4.

Referring to FIG. 5 which is a partial cross-sectional view of FIG. 4 along line V—V, openings 98 are provided between the electrodes of the thermocouples 82 to decrease the cross section of the thin film portion 802 between the hot junctions 83 and the cold junctions 84. Therefore, the cross section of the heat flow passage between the hot junction 83 and the cold junction 84 of each thermocouple is decreased to decrease the amount of heat conduction. As a result, even when the distance between the hot junction 83 and the cold junction 84 of each thermocouple is decreased, the amount of heat conduction from the infrared absorber 81 can be suppressed to suppress a change in temperature on the cold junction side. Therefore, the electromotive force of each thermocouple 82 can be increased to increase the measurement sensitivity, and thus the thermopile chip SPC of this embodiment has the construction suitable for forming the compact infrared sensing element 21 with high sensitivity.

Although the cross section can be decreased by decreasing the thickness of the thin film portion 802, it is possibly difficult to control the thickness. However, the holes or slits 98 which pass through the thin film portion 802 can be formed at the same time as the hollow portion KW in the etching step of forming the hollow portion KW or in a series of subsequent steps, exhibiting excellent productivity. Furthermore, when the length direction of the slits 98 is parallel to the direction in which the hot junction 83 and the cold junction 84 are connected to each other, the cross section of the thin film portion 802 can be decreased without increasing the interval between the conductors 92 of the thermocouples 82, each of which connects the hot junction 83 and the cold junction 84. Therefore, the thermocouples 82 can be formed closely in the direction perpendicular to the length direction of the electrodes 92, and many thermocouples 82 can thus be formed in the compact thermopile chip SPC to form the thermopile 85 exhibiting high output voltage and high sensitivity.

The thermopile chip SPC further comprises two conductor regions DN and DP which are formed on the main surface 80a of the semiconductor substrate 810 to surround the cold junctions 84 in the peripheral, thick wall portion 801. The conductor region DN comprises a N+ region with a high dose of donor impurity, and is located on the outer peripheral side and divided into two regions DN1 and DN2 which are formed in a L-shape and symmetric with respect to a point along the periphery of the base 80. The conductor region DP comprises a P+ region with a high dose of acceptor impurity, and is formed inside of the regions DN1 and DN2 opposite to the regions DN1 and DN2. Although the conductor region DP has a continuous shape, the conductor region DP is divided into two regions denoted by DP1 and DP2 opposite to the regions DN1 and DN2, respectively, in FIG. 2. Therefore, the regions DN1 and DP1 and the regions DN2 and DP2 form two PN junctions on the semiconductor substrate 810. Assuming that the regions DP1 and DP2 form an anode region, and the regions DN1 and DN2 form a cathode region, two diodes D1 and D2 are formed by the regions DN1 and DP1, and the regions DN2 and DP2. Hereinafter, each of the PN junctions is referred to as a "diode".

In the thermopile chip SPC of this embodiment, the two diodes D1 and D2 are formed in a strip shape along every side of the thick wall portion 801 so as to surround all sides of the infrared absorber 81. The diodes D1 and D2 are also formed to surround the cold junctions 84 of the thermopile 85 in the vicinity of the cold junctions 84. The temperatures of the diodes D1 and D2 can be determined by outputs from the diodes D1 and D2. Therefore, the diodes D1 and D2 are formed in the thick wall portion 801 serving as the heat sink so that the diodes can be used as the thermosensitive portions of reference temperature sensing means 70 for determining the reference temperature Tr as the temperature of the cold junctions 84 of the thermopile 85. Furthermore, an anode terminal DA common to the diodes D1 and D2, and cathode terminals DK1 and DK2 of the diodes D1 and D2 are provided on the main surface 80a, for supplying the outputs of the diodes D1 and D2 serving as the thermosensitive portions of the reference temperature sensing means 70 to the outside.

As described above, in the thermopile chip SPC which constitutes the infrared sensing element 21 of this embodiment, the diodes D1 and D2 serving as the thermosensitive portions are formed directly in the thick wall portion 801 of the base 80, which serves as the heat sink. Therefore, the temperature of the cold junctions 84 can be measured by the base 80 including the cold junctions 84. Particularly, in the thermopile chip SPC of this embodiment, the cold junctions 84 and the diodes D1 and D2 are physically connected through the semiconductor substrate 810 with high heat conductivity and the semiconductor material laminated thereon, whereby the temperature of the cold junctions 84 can be measured with high accuracy. Also, the distance between the diodes D1 and D2 and the cold junctions 84 is very small on the order of millimeters or less. Therefore, from this viewpoint, the temperature of the cold junctions 84 can be accurately measured by the diodes D1 and D2 serving as the thermosensitive portions.

The principle of temperature measurement which can be performed by a diode serving as the thermosensitive portion is described below. The forward current IF and forward voltage or voltage drop VF of a diode have the following relation:

$$IF = IS(\exp(qVF/KT) - 1) \quad (1)$$

where:

IF: Forward current [A]

IS: Reverse saturation current [A]

T: Absolute temperature [° K]

VF: Forward voltage [V]

K: Boltzmann constant ($1.3804 \times 10^{-23}$ [JK$^{-1}$])

q: Charge ($1.602 \times 10^{-19}$ [C])

Equation (1) can be solved for VF resulting in the following equation (2):

$$VF = (KT/q)\ln(IF/IS) \quad (2)$$

Equation (2) indicates that temperature T, i.e. the reference temperature Tr of the thermosensitive portion, can be measured based on the voltage drop VF of diode D1 or D2. However, in order to determine the reference temperature Tr from the voltage drop VF of one PN junction, the forward current IF and the reverse saturation current IS must be determined. Since these values cannot be easily directly determined, the most practical method comprises measuring the relation between temperature and voltage, tabulating and storing the relation, and determining the reference temperature Tr based on the detected forward voltage VF.

Furthermore, a difference ΔVF of forward voltage drops VF is determined as the following equation (3):

$$\Delta VF = (KT/q)\ln(IF1/IS1) - (KT/q)\ln(IF2/IS2) \quad (3)$$
$$= (KT/q)(\ln(IF1/IS1) - \ln(IF2/IS2))$$
$$= (KT/q)(\ln(IF1/IF2) - \ln(IS1/IS2))$$

Furthermore, when two diodes having the same impurity concentration are formed in the same semiconductor substrate by the same manufacturing method, the reverse saturation currents IS of the two diodes may be considered as substantially the same, and thus the term of the reverse saturation currents IS can be removed. Therefore, the following equation (4) can be obtained:

$$\Delta VF = (KT/q)(\ln(IF1/IF2)) \quad (4)$$

Also, the ratio of forward currents flowing through the two diodes is considered, and thus the current values themselves need not be determined. Therefore, in the infrared sensing element 21 of this embodiment, the temperature coefficient can be determined from the forward voltage drops VF1 and VF2 of diodes D1 and D2 according to the following equation (5):

$$\Delta VF/T = (K/q)\ln(IF1/IF2) \quad (5)$$

Therefore, the temperature of the thick wall portion 801 of the base 80 can be accurately determined according to the above equation.

Figure 6:
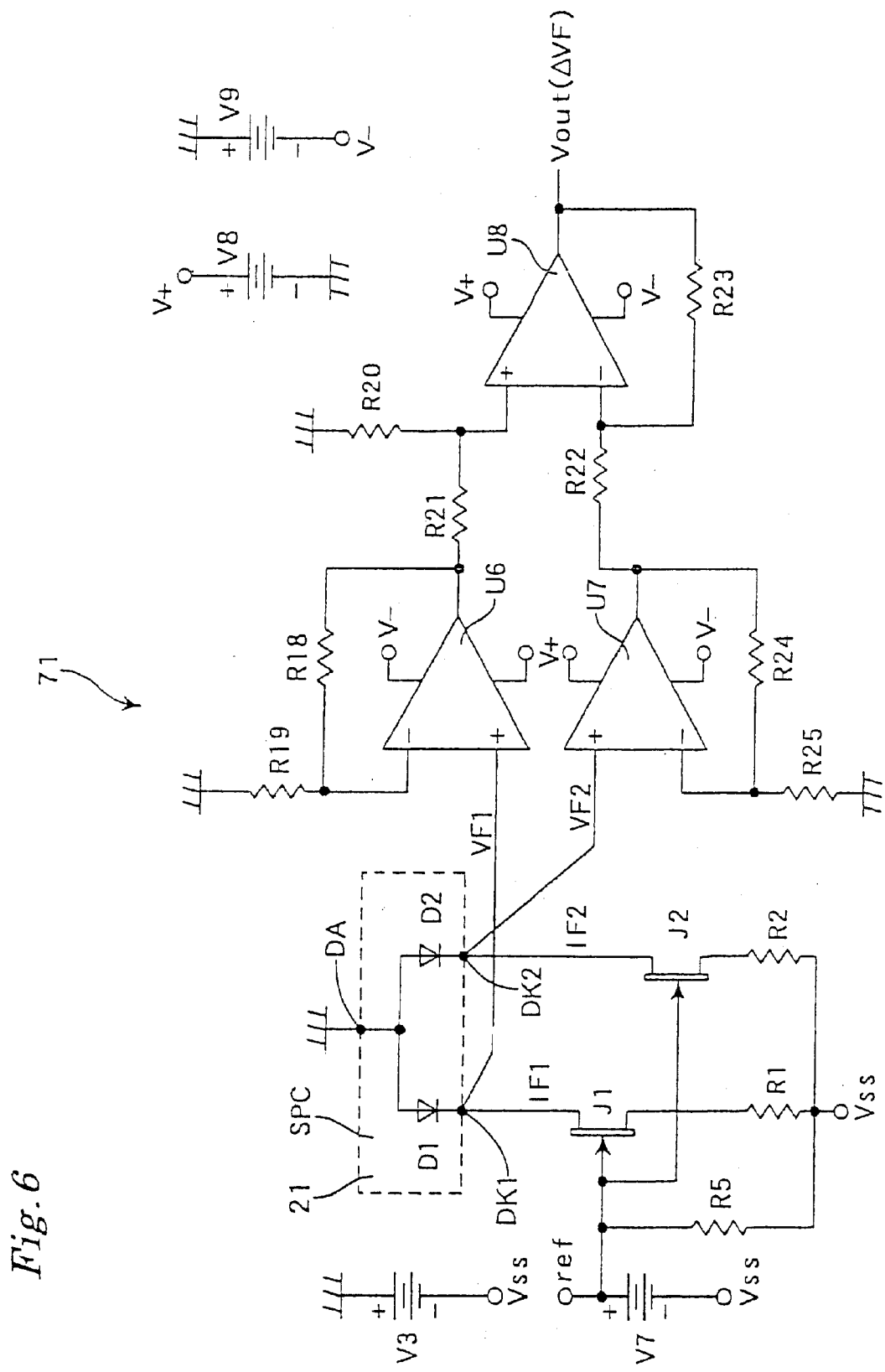
FIG. 6 is a block circuit diagram showing an example of an amplifier which outputs a difference between the forward voltage drops of two diodes formed in the thermopile chip shown in FIG. 2.
Figure 26:
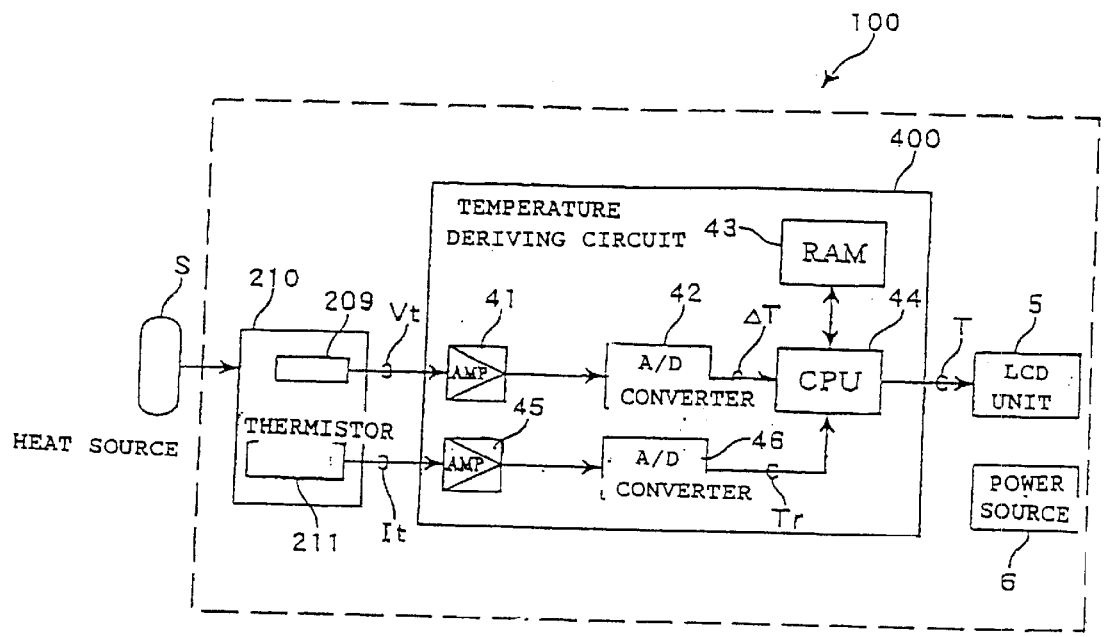
FIG. 26 is a sectional view schematically showing the functional configuration of the ear-type clinical thermometer shown in FIG. 21.

FIG. 6 shows an example of an amplifier which detects the forward voltage drops VF1 and VF2 of diodes D1 and D2 and outputs the difference ΔVF. The amplifier 71 shown in FIG. 6 can be provided in place of, for example, the amplifier 41 of the temperature deriving circuit 400 described above with reference to FIG. 26. In stead of the thermistor 211, the amplifier can take outputs from the diodes D1 and D2 serving as the thermosensitive portions in contact with the base 80 to output the difference ΔVF which gives the reference temperature Tr with high accuracy. Therefore, the signal of the difference is digitized and processed as data of the reference temperature Tr in the CPU 44, whereby the temperature T of the heat source can be determined with high accuracy on the basis of the output from the thermopile 85.

The amplifier 71 of this example comprises a constant current source composing a transistor J1 and resistance R1 (for example, 50 kΩ), for supplying the forward current IF1 to the diode D1, and a constant current source composing a transistor J2 and resistance R2 (for example, 100 kΩ), for supplying the forward current IF2 to the diode D2. The amplifier 71 further comprises operational amplifiers U6 and U7 for amplifying the forward voltage (the potential difference between the anode terminal DA and the cathode terminal DK1) VF1 proportional to the internal resistance of the diode D1, and the forward voltage (the potential difference between the anode terminal DA and the cathode terminal DK2) VF2 proportional to the internal resistance of the diode D2, respectively, and a differential amplifier U8 for outputting a voltage proportional to the difference between the amplified voltages VF1 and VF2. Therefore, the difference ΔVF between the forward voltages VF1 and VF2 can be output as the output Vout of the amplifier 71.

By determining the temperature using the difference ΔVF determined by the amplifier 71, the influence of the reverse saturation current can be canceled, and the temperature can be accurately measured even when the diode characteristic of the reverse saturation current of the formed diode indicates a value different from the theoretical value. Furthermore, when the resistances R1 and R2 which determine the forward currents IF1 and IF2 flowing through the two diodes D1 and D2 are different values, for example, of 50 kΩ and 100 kΩ, the forward currents IF1 and IF2 can be set to different values. With the constant ratio of these values, the influence of variations in the forward currents on temperature measurement can also be removed. Therefore, even with a simple mechanism, it is possible to remove measurement error due to a difference in diode characteristics due to variations in the reverse saturation current with chips, noise, a variation in potential, and other factors of variations in measurement environment, and simply measure the temperature with high accuracy.

Furthermore, each of the above equations indicates that when the diode, i.e. the PN junction, is used as the thermosensitive portion, unlike a thermistor, the output characteristic is theoretically independent of the temperature. In addition, like the thermocouple, it is unnecessary to correct the reference temperature, and thus the diode is suitable for the thermosensitive portion for determining the reference temperature Tr of the thermopile 85. Therefore, by utilizing the infrared sensing element 21 of this embodiment, a clinical thermometer can be provided, which has no need to limit room temperature of measurement, or which can easily measure the body temperature at any time in any place beyond the limited range of 15° C. or more.

Figure 7:
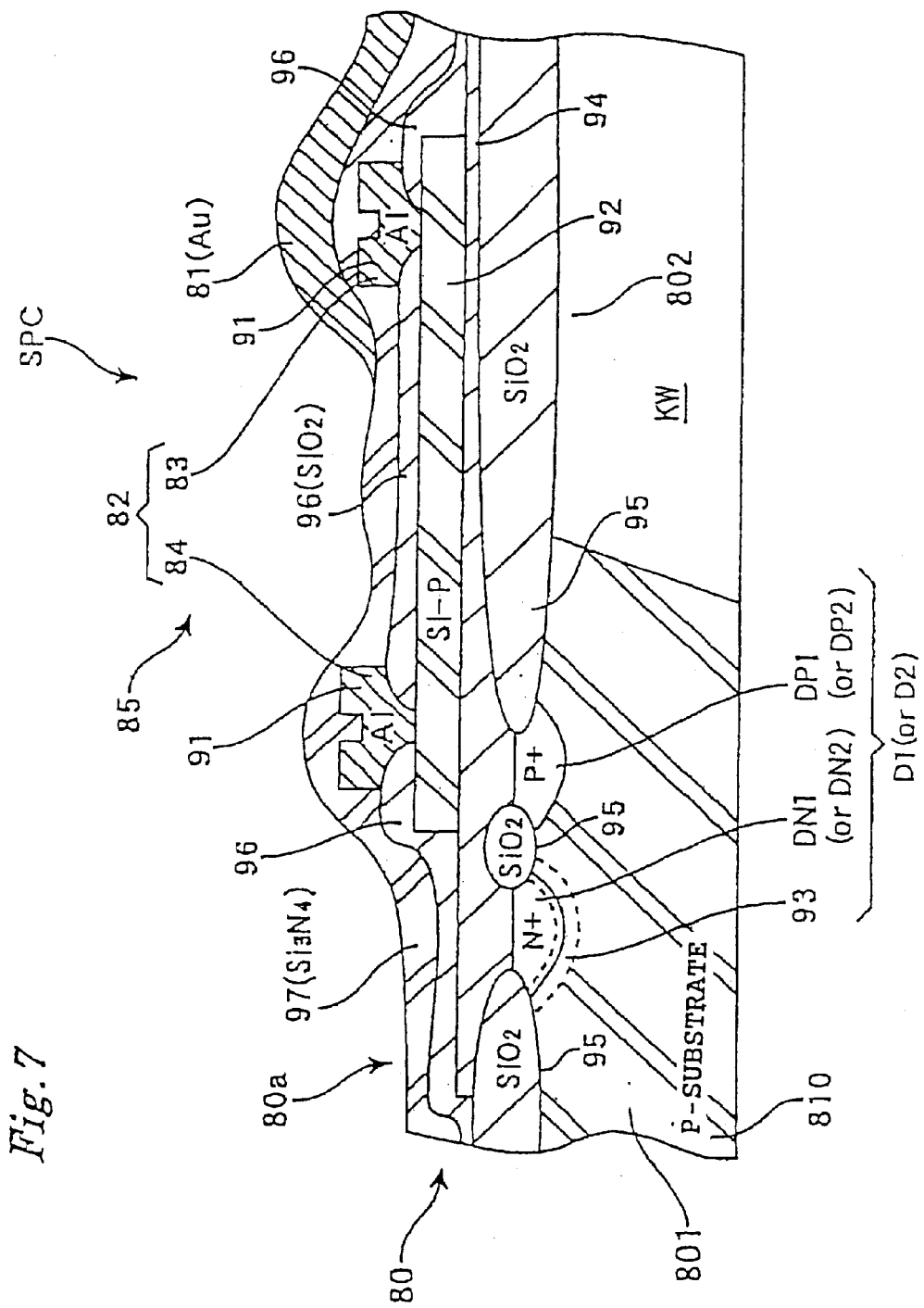
FIG. 7 is a sectional view showing a portion of the thermopile chip shown in FIG. 2.

FIG. 7 is a partial sectional view of the construction of the thermopile chip SPC of this embodiment. In the thermopile chip SPC of this embodiment, the infrared absorber 81 is formed on the thin film layer 802 having a thickness of several microns and comprising oxide films ($SiO_2$) 94 and 96, a nitride film ($Si_3N_4$) 97 with low thermal conductivity in order to prevent escape of the absorbed heat to the circumference to increase a temperature rise, and oxide film 95. The diodes D1 and D2 are formed on the surface of the semiconductor substrate 810 directly below the cold junctions 84 serving as the principal reference point in measuring the temperature by the thermopile 85. The PN junction region as each of the diodes D1 and D2 is the portion 93 denoted by dotted lines in the N+ region DN1 or ND2 shown in FIG. 7.

The process for manufacturing the infrared sensing element 21 of this embodiment will be described in brief with reference to FIG. 7. In the above-mentioned infrared sensor 209, a thin film layer of an oxide film 94 is formed on the surface (main surface) of the silicon substrate 810, for example, by a CVD (Chemical Vapor Deposition) method. In the thermopile chip SPC of this embodiment, before the oxide film 94 is formed, a field oxide film 95 is first formed on the P-semiconductor substrate, for element separation. Then, the field oxide film 95 is patterned, and selective regions of silicon substrate 810 are doped with impurities to form the P+ regions DP1 and DP2 and the N+ regions DN1 and DN2. As a result, the diodes D1 and D2 are formed on the semiconductor substrate 810.

Then, oxide film 94, a polysilicon layer 92 that is part of each of the thermocouples 82, another oxide film 96 for electrode separation, an aluminum electrode 91 that are also each of the thermocouples 82 are formed in turn by photolithography. Oxide film 94 provides a flat surface upon which the subsequent layers are constructed. Oxide film 94 may be flattened, for example, by a CMP (Chemical Metrical polishing) process or by appropriate grow time taking into account the difference in oxide growth on oxide layer 95 and exposed regions of semiconductor substrate 810. Then, a surface protecting film 97 of silicon nitride is formed to cover these films, and gold black as a black body is deposited to form the infrared absorber 81. After the structure of the main surface 80a is formed by the above steps, the central portion of the back of the semiconductor substrate 810, which is used as the substrate of the base 80, is etched up to the oxide film 95, functioning as an etch stop, according to a pattern to form the thin film portion 802 at the center of the base 80. Then, square break, a unit test (chip test), assembly including junction of the binary lens BL manufactured in parallel with the thermopile chip SPC, etc. are performed according to the necessity for handling. As a result, the infrared sensing element 21 shown in FIG. 1 is formed.

The oxide films ($SiO_2$) 94 and 95, or the like, function as etch stops in the etching of the back surface to form the membrane structure. By forming oxide film 95 in a specific pattern to avoid regions corresponding to slits 98 and removing the portion of the film layer 94 corresponding to each of the slits 98, the slits 98 can be simultaneously formed in the etching step of forming the membrane structure.

Figure 23:
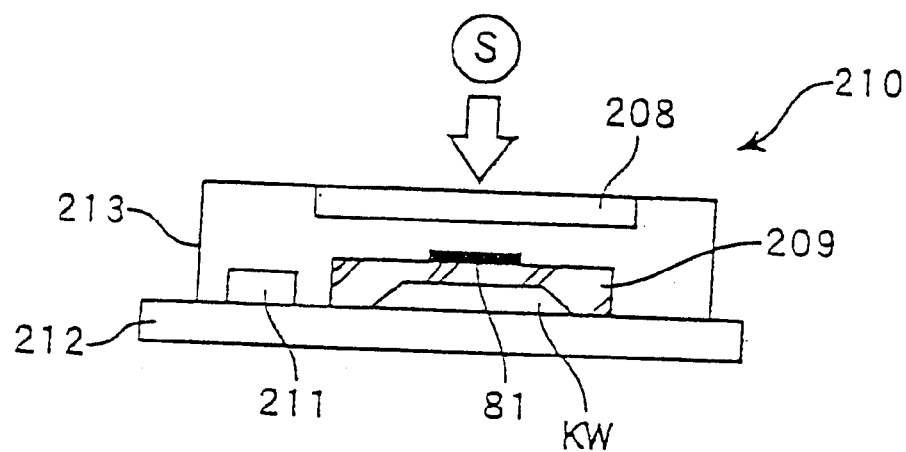
FIG. 23 is a drawing schematically showing a conventional infrared sensing element.
Figure 24:
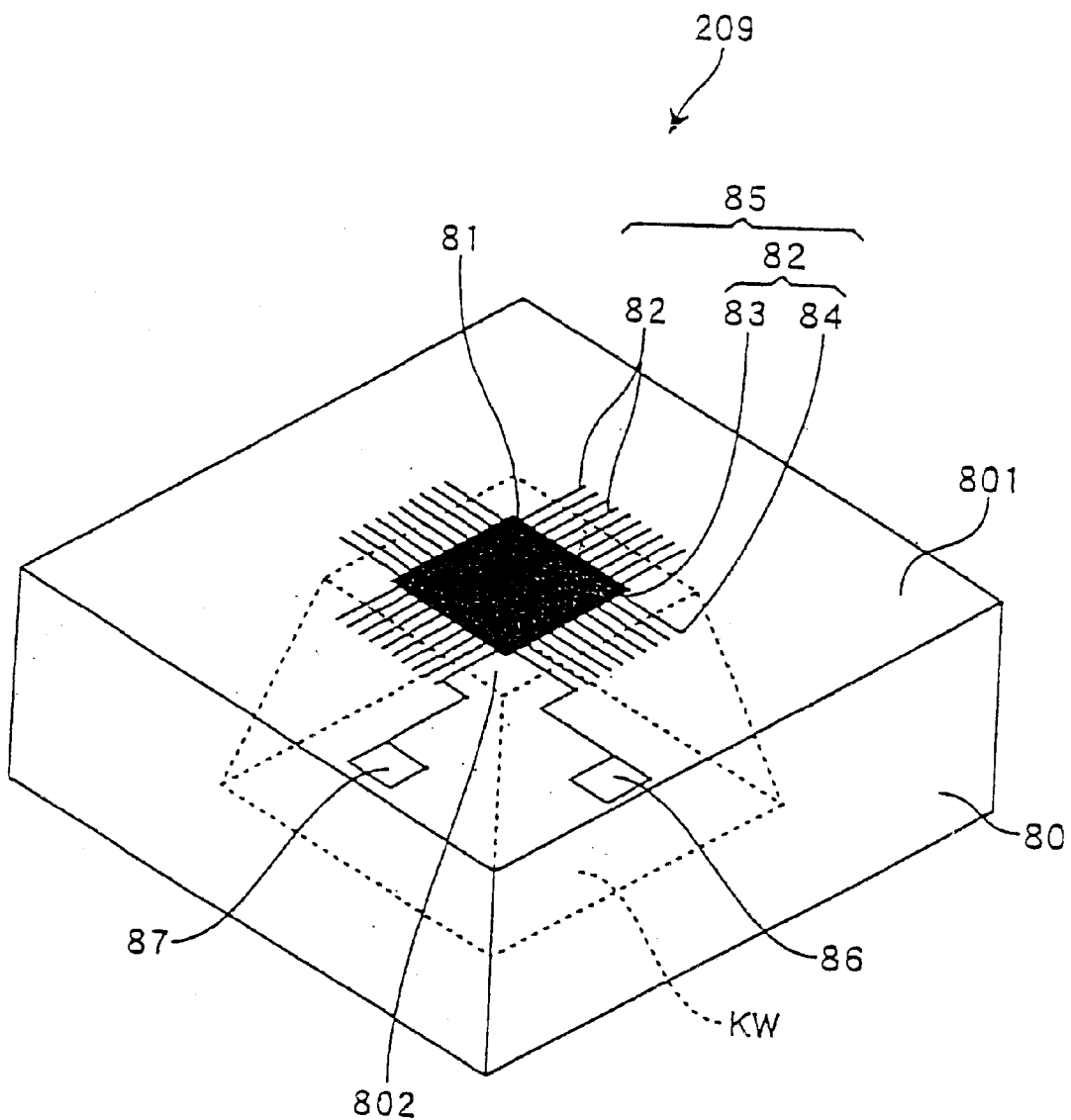
FIG. 24 is a perspective view of an infrared sensor of the infrared sensing element shown in FIG. 23.
Figure 25:
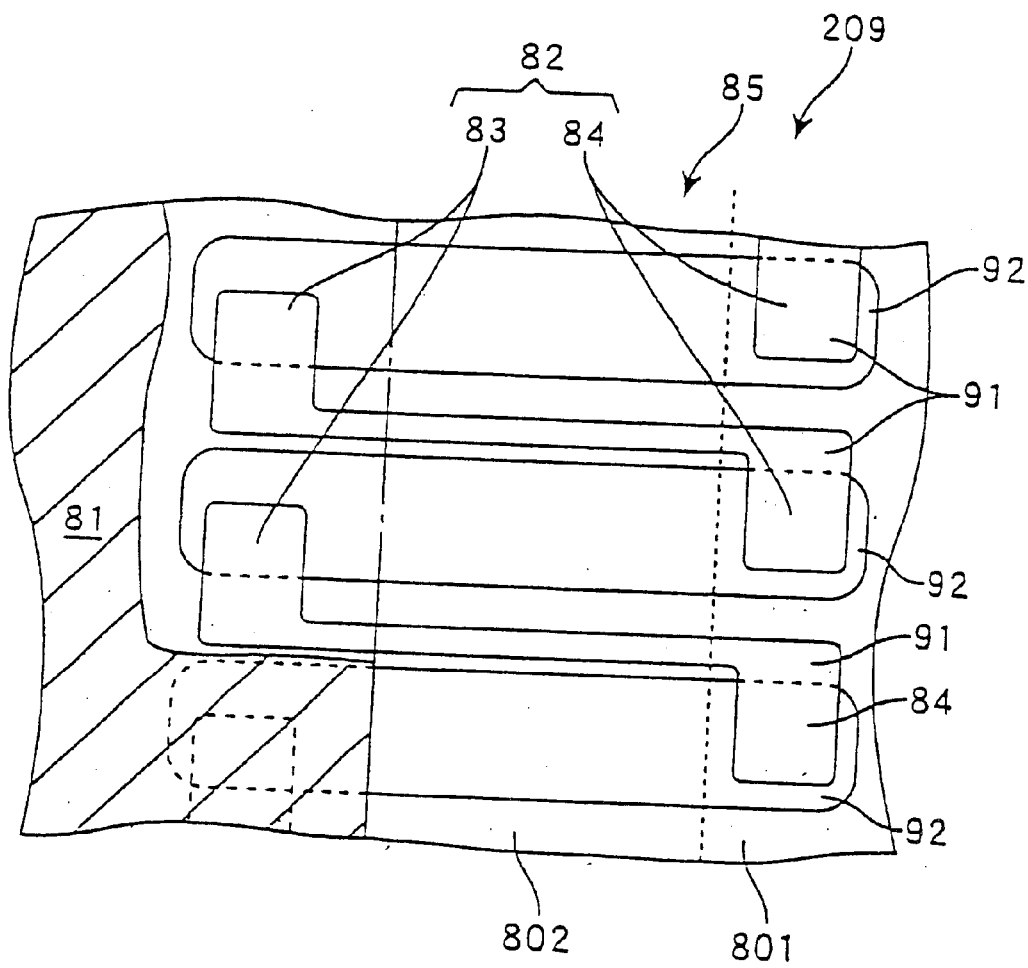
FIG. 25 is a plan view showing a thermopile formed in the infrared sensor shown in FIG. 24.

As described above, in a thermopile infrared sensing element, an electromotive force produced between hot junctions (on an infrared absorber side that receives infrared radiation) and cold junctions (on a reference temperature side) resulting from a change in temperature of the infrared absorber relative to the reference temperature is detected, and in principle the temperature difference between the hot junctions and the cold junctions can be determined based on the detected electromotive force. However, the reference temperature is typically measured by some other temperature sensing device that is separate from the package substrate holding the thermopile infrared sensing element. Therefore, a temperature difference between the reference temperature and the cold junction temperature of the thermopile causes error, deteriorating the measurement accuracy. An attempt to mitigate this error is shown in the example of prior art sensing chip 210 of FIG. 23 wherein the thermistor 211, which determines the reference temperature, is provided on the package substrate 212 along with the infrared sensor 209. Therefore, the measurement accuracy is improved, as compared with a case in which the thermistor is provided outside the package, i.e. outside the chip. However, the distance between the measurement point of the reference temperature measured by the thermistor 211 and the cold junctions of the infrared sensor 209 is still relatively large, and thus the temperature of the cold junctions cannot be accurately assumed to be the same as the reference temperature measured by the thermistor 211.

By contrast, in the infrared sensing element 21 of the present invention, diodes D1 and D2 serve as thermosensitive devices for detecting the reference temperature of the cold junctions 84 of thermopile 85, and are integrally formed on the silicon substrate 810 on which the thermopile 85 is formed. The reference temperature is determined from the temperature characteristics of the diodes. That is, in the infrared sensing element of this embodiment, the diodes D1 and D2 serve as the thermosensitive portions and are arranged in contact with the base 80 and built in the base 80. Since the temperature of the heat sink of the cold junctions can be measured directly by determining the reference temperature with the thermistor in contact with the base 80, the measurement accuracy is greatly improved as compared with the conventional infrared sensing chip 210 shown in FIG. 23. Additionally, the conventional thermistor of the prior art cannot be easily manufactured in integral contact with the base 80. In this embodiment, by using the diode as the thermosensitive portion, the diode can be formed integrally with the silicon substrate 810 of the base 80. Therefore, the diode and the thermopile 85 can be formed integrally with the thermopile chip SPC to significantly decrease the distance between the thermopile 85 and the diode, thereby further decreasing the measurement error of the reference temperature of the thermopile 85. Thus, the temperature of the cold junctions 84 can be measured more accurately resulting in a more accurate reference temperature, which in turn provides an infrared sensing element with high measurement accuracy.

The components, including the diodes D1 and D2 serving as the thermosensitive portions, the infrared absorber 81, the thermopile 85, etc., of the infrared sensing element 21 can be formed on the semiconductor substrate 810 by using general methods for manufacturing a semiconductor, such as CVD, or the like. Therefore, in the infrared sensing element 21 of this embodiment, the components can easily accurately be formed on the semiconductor substrate 810, and are suitable for mass production. Furthermore, the reference temperature Tr can accurately be measured, thereby providing a small infrared sensing element with high measurement accuracy at low cost.

Since the temperature characteristic of a thermistor tend to change greatly, a thermistor typically has a limited temperature range of about 15° C. or so in which the temperature can accurately be measured. In the present invention, however, since the characteristics of the diodes have substantially no dependency on temperature, they thereby permit temperature measurements with high accuracy within a temperature range of 5° C. to 40° C. The infrared sensing element 21 of this embodiment can thus be used under various environments. Furthermore, the infrared sensing element 21 of this embodiment uses two diodes D1 and D2 to remove the influences of the reverse saturation currents and the forward currents on temperature measurement. Therefore, an infrared sensing element with higher measurement accuracy can be provided.

Figure 8:
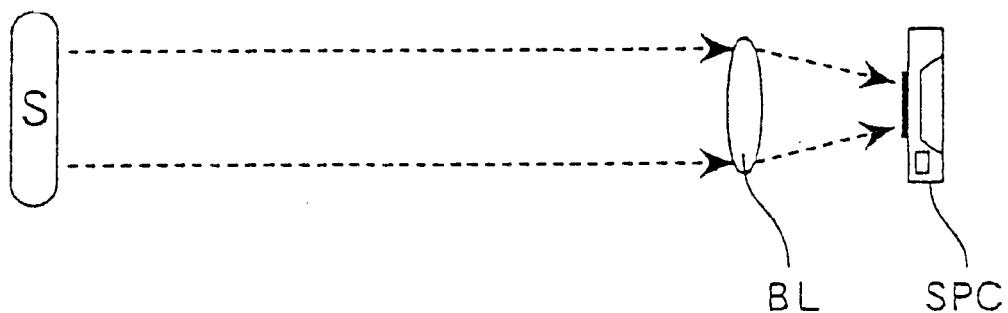
FIG. 8 is a drawing illustrating an example of an infrared sensing element in which a binary lens chip is arranged away from a thermopile chip.
Figure 22:
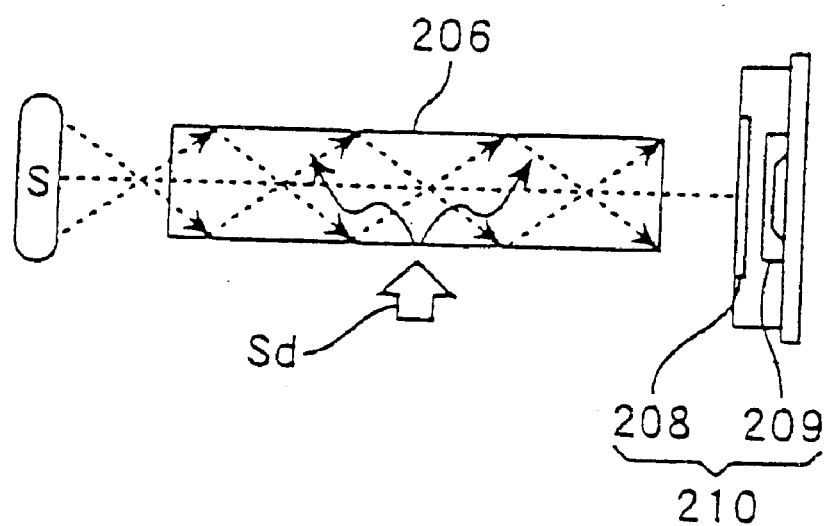
FIG. 22 is a drawing showing the state in which infrared radiation from a heat source is guided to the infrared sensing element in the ear-type clinical thermometer shown in FIG. 21.

As shown in FIG. 1, in the infrared sensing element 21 of this embodiment, the binary lens BL is joined to the thermopile chip SPC. However, as shown in FIG. 8, the binary lens BL can be arranged away from the thermopile chip SPC so that the wave guide 206 of FIG. 22 is replaced by the lens. However, in this arrangement, the binary lens BL is separated from the thermopile chip SPC. Therefore, a temperature difference may occur between the binary lens BL and the thermopile chip SPC. With a temperature difference between the binary lens BL and the thermopile chip SPC, the influence of infrared radiation received through the lens BL under a different temperature environment is observed to easily cause error, possibly influencing the measurement accuracy.

However, in the infrared sensing element 21 of the present embodiment, the binary lens BL is joined to the surface of the thermopile chip SPC. Therefore, the temperature difference between the thermopile chip SPC and the binary lens BL is lessened, and the above-described error is likewise lessened due to the binary lens BL. Furthermore, the binary lens BL is joined to the thick wall portion 801 of the base 80, and the diodes D1 and D2 serving as the thermosensitive portions are arranged near the junction between the binary lens BL and the thermopile chip SPC, for detecting the reference temperature. It is thus possible to decrease not only the measurement error due to the temperature difference between the reference temperature and the cold junction temperature, but also the measurement error due to the temperature difference between the measurement point of the reference temperature and the lens temperature. Therefore, temperature measurement with higher accuracy can be performed. Of course, in temperature measurement applications requiring lower accuracy, an infrared sensing chip in which the binary lens BL is separated from the thermopile chip SPC can be used. Also, an infrared sensing chip without the binary lens BL, i.e. a simple thermopile chip, is also included in the scope of the present invention. Such an infrared sensing chip can be used, for example, by integrating with the clinical thermometer 100 using the wave guide 206.

Figure 9:
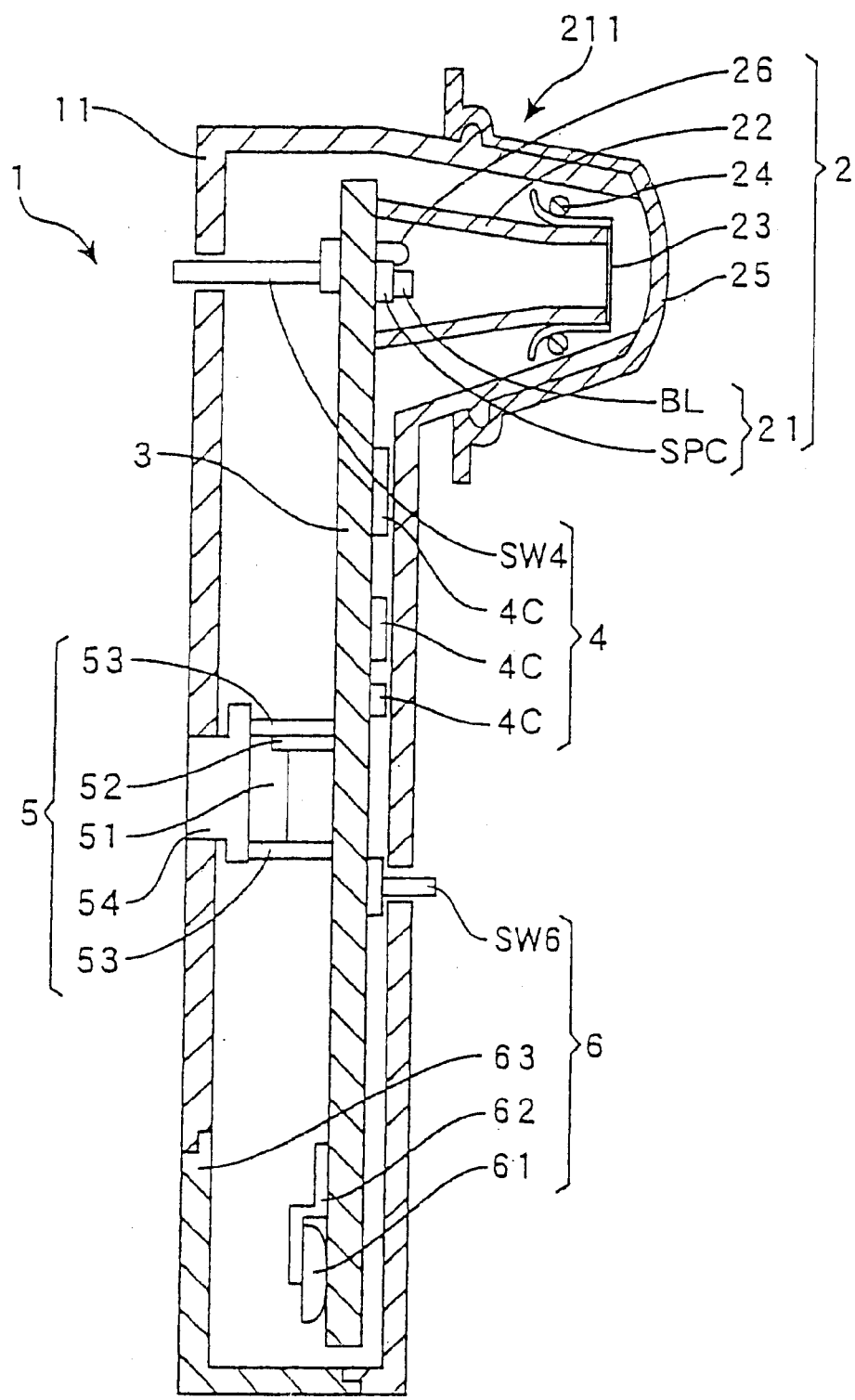
FIG. 9 is a sectional view schematically showing an ear-type clinical thermometer comprising an infrared sensing chip of the present invention.

FIG. 9 is a sectional view schematically showing an ear-type clinical thermometer 1 into which the infrared sensing element 21 of this embodiment is integrated. The ear-type clinical thermometer 1 comprises a body case 11, an infrared receiving sensing unit 2 which receives infrared radiation emitted from a heat source S, shown in FIG. 10, to output an electrical signal according to the temperature of the heat source S, and a circuit board 3 on which various electronic elements (circuits) are mounted and connected. The various electronic parts 4C mounted on the circuit board 3 constitute a temperature deriving circuit 4 for determining the temperature of the heat source S based on the output voltage of the infrared receiving sensing unit 2. Furthermore, a LCD unit 5 for displaying the measured temperature, and the like, and an electric power source 6 for supplying electric power to each of the units are connected to the circuit board 3.

The electric power source 6 comprises a power switch SW6, a button battery 61, and a battery terminal fitting 62 for connecting the button battery 61 mounted thereto to a circuit pattern of the circuit board 3, a portion of the case 11 constituting a battery box cover 63 which is opened and closed for changing the battery. The LCD unit 5 comprises a LCD panel 51 for various displays, a connector 52 for connecting the LCD panel 51 mounted thereto to the circuit board 3, and a panel frame 53 for supporting the LCD panel 51. A portion of the case 11 constitutes, for example, a plastic transparent cover 54 for visibly protecting the 35 surface of the LCD panel 5.

The infrared receiving sensing unit 2 comprises the infrared sensing element 21 of the present embodiment, which constitutes the heart of the infrared receiving sensing unit 2 to receive infrared radiation corresponding to the temperature of the heat source (body temperature: temperature of the tympanic membrane) and outputting an voltage signal according to the infrared radiation, a plastic cover 22 for protecting the element 21, an infrared transmitting film 23 for preventing entrance of dust particles into the cover 22, a film holding O-ring 24 for supporting the film 23, and an infrared transmitting probe cap 25 mounted to cover the entire infrared receiving sensing unit because the infrared receiving sensing unit is inserted into the lughole during measurement of body temperature. The portion 211 of the case 11 which contains the infrared receiving sensing unit 2 has a cylindrical shape having a tapered front end, and the infrared sensing element 21 is provided in the portion 211 so that the binary lens BL faces the front end. Therefore, infrared radiation transmitted through the probe cap 25 mounted at the front end of the cylindrical portion 211 is concentrated onto the infrared absorber 81 of the thermopile chip SPC. The infrared sensing element 21 is also mounted on the circuit board 3, and the thermopile chip SPC is connected to the circuit board 3 with a bonding wire 26 so that outputs of the diodes D1 and D2 and output of the thermopile 85 are input to the temperature deriving circuit 4 of the circuit board 3.

Figure 10:
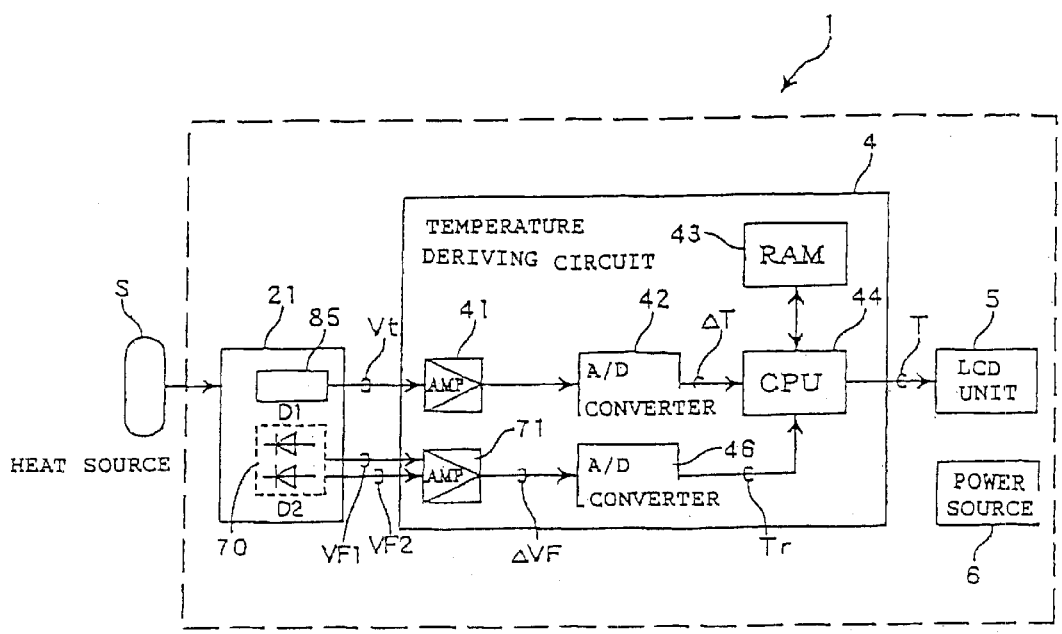
FIG. 10 is a block diagram schematically showing the functional configuration of the ear-type clinical thermometer shown in FIG. 9.

FIG. 10 shows the temperature deriving circuit 4 of this embodiment. The temperature deriving circuit 4 has substantially the same configuration as the temperature deriving circuit 400 described above with reference to FIG. 26 except that the amplifier 71 shown in FIG. 6 is used for processing the forward voltage drops VF1 and VF2 of the diodes D1 and D2 which are input to the temperature deriving circuit 4. The difference ΔVF between the forward voltage drops VF1 and VF2 is converted into a digital signal by the A/D converter 46 and supplied as a signal indicating the reference temperature Tr to the CPU 44.

Additionally, the temperature measuring circuit 4 of this embodiment comprises an amplifier 41 for amplifying a signal indicating the body temperature output from the infrared sensing element 21 provided in the infrared receiving sensing unit 2, i.e. a voltage signal output from the thermopile 85, an A/D converter 42 for digitizing the output, a CPU 44 for performing numerical processing of the output value to determine the body temperature and display the temperature on the LCD 5, and a RAM 43 serving as a work area for each processing in the CPU 44. The temperature measuring circuit 4 further comprises the amplifier 71 for amplifying the outputs of the diode D1 and D2 of the reference temperature sensing means 70 of the sensing element 21 to output the difference ΔVF between both outputs, and an A/D converter 46 for digitizing the output. The CPU 44 performs processing for determining the temperature T from the output Vt of the thermopile 85 based on the difference ΔVF considered as the reference temperature Tr.

For example, the power source switch SW6 and the temperature measurement switch SW4 shown in FIG. 9 are connected to an input port of the CPU 44 so that when the power source is turned off in the initial state, the CPU 44 is in a stand-by state, while the other circuits are in a non-conduction state. In this state, when the power source switch SW6 is pushed by the user, the CPU 44 detects a level change as an interrupt signal and is brought into an active state, while the other circuits are brought into a conduction state. When the CPU 44 is activated, the CPU 44 first displays "all lighting" (initial display) on the LCD panel 51, and then makes preparation for measurement, such as initialization of various flag or the like. After the preparations are completed, the CPU 44 displays that "preparation for measurement is OK".

Next, in the state in which preparations for measurement is OK, when the temperature measurement switch SW4 is pushed by the user, the CPU 44 activates the A/D converters 42 and 46 to obtain the output Vt from the infrared sensing element 21 as a digital value through the amplifier 41 and the A/D converter 42. The CPU 44 also obtains a measurement of the difference of outputs VF1 and VF2 from the diodes D1 and D2 as digital values through the amplifier 71 and the A/D converter 46. Then, the CPU 44 determines the reference temperature from the output from the A/D converter 46 while correcting the output with the offset voltage of each amplifier, and computes the temperature T from the output from the A/D converter 42 based on the reference temperature.

After the temperature T is determined, the value T is displayed as a measurement result on the LCD panel 51 preferably accompanied with a beeping indicator, and the A/D converters 42 and 46 are deactivated. In this state, when the power source switch SW6 is pushed, or when the power source switch SW6 and the temperature measurement switch SW4 are not operated within a predetermined time thereafter, the power source is turned off in the initial state by auto-power off.

In use of the ear-type clinical thermometer 1, the user first pushes the power source switch SW6 and recognizes that the LCD panel 53 is changed from the initial display to the display of "OK measurement preparation". Then, the probe cap 25 is inserted into the lughole, and the temperature measurement switch SW4 is pushed to start measurement. Several seconds after, the measurement value is displayed on the LCD panel 51 accompanied with an information sound, and thus the value (body temperature) can be recognized. Then, the power source switch SW6 is pushed, or the thermometer 1 is allowed to stand to turn the power source off by auto-power off.

Figure 21:
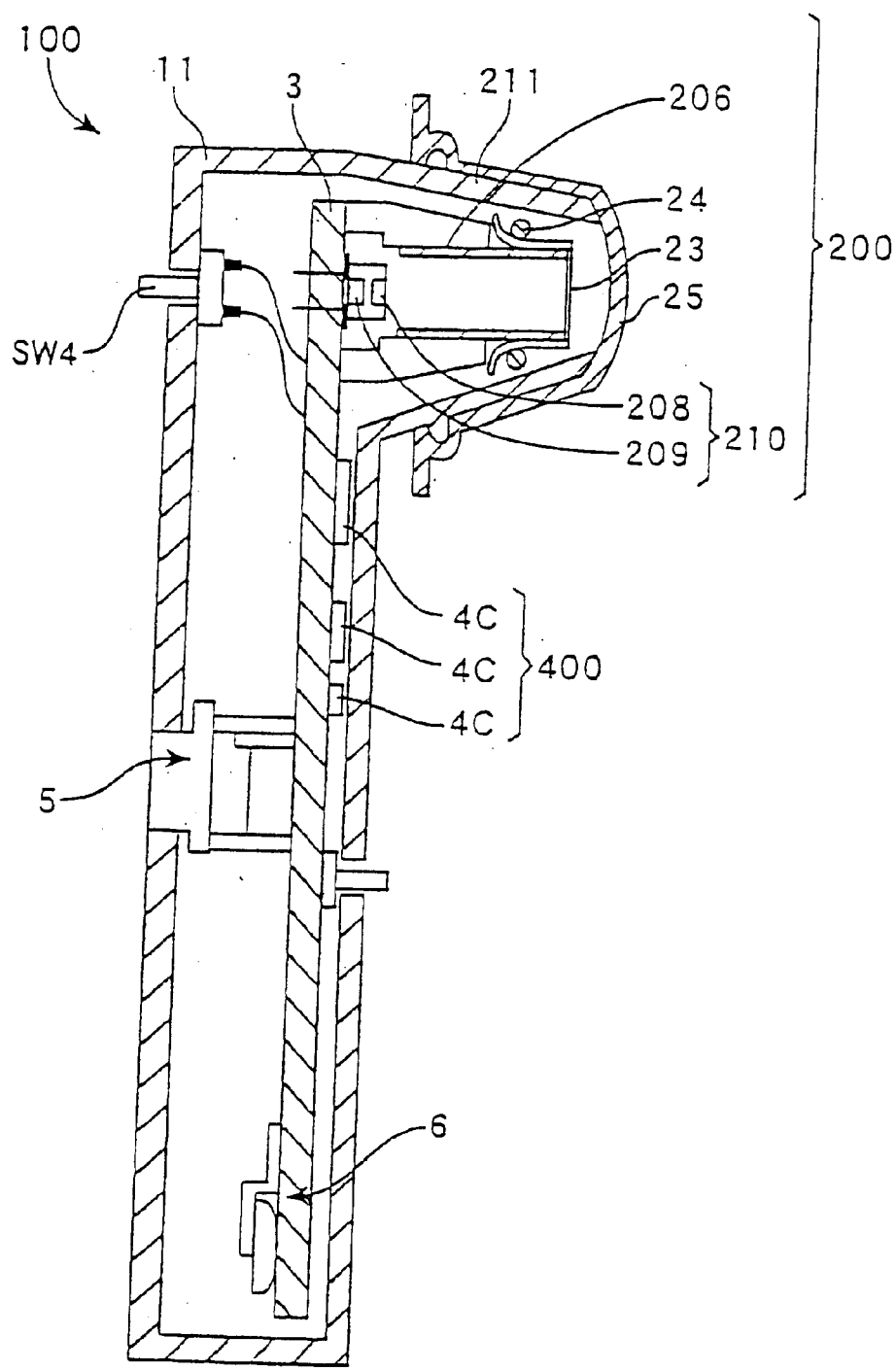
FIG. 21 is a sectional view schematically showing an ear-type clinical thermometer using a conventional infrared sensing element.

In the ear-type clinical thermometer 1, the small low-cost infrared sensing element 21 of this embodiment, which is capable of measuring temperature with high accuracy, is incorporated into the infrared sensing unit 2, and thus the ear-type clinical thermometer itself is a small low-cost device capable of measurement temperature with high accuracy. The ear-type clinical thermometer 1 preferably does not use the wave guide. In induction of infrared radiation by using such a wave guide 206 as shown in FIG. 21, the angle of view from the window plane (sensing plane) of the infrared filter 23 is about 180°, and thus infrared radiation from the outside of the wave guide 206 is also incident. Also, as shown in FIG. 22, infrared radiation in the wave guide 206 is subjected to interference due to external heat Sd. Furthermore, light diffusely reflected due to the interference in the wave guide is incident on the sensing plane to increase measurement error.

In contrast, the ear-type clinical thermometer 1 of this embodiment comprising the infrared sensing element 21 using the binary lens BL for concentrating infrared radiation on the thermopile chip SPC, whereby the angle of incidence of infrared radiation can be restricted. Therefore, it is possible to decrease the error due to incidence of infrared radiation, and measure the body temperature with high accuracy as compared with the clinical thermometer using the wave guide 206. Since the infrared sensing chip 21 in which the binary lens BL and the thermopile chip SPC are integrally connected together is used, substantially no error occurs in measurement due to the difference between the reference temperature and the lens temperature.

Furthermore, the ear-type clinical thermometer 1 can measure the temperature of the human tympanic membrane as the heat source and display the temperature as the body temperature T.

Figure 11:
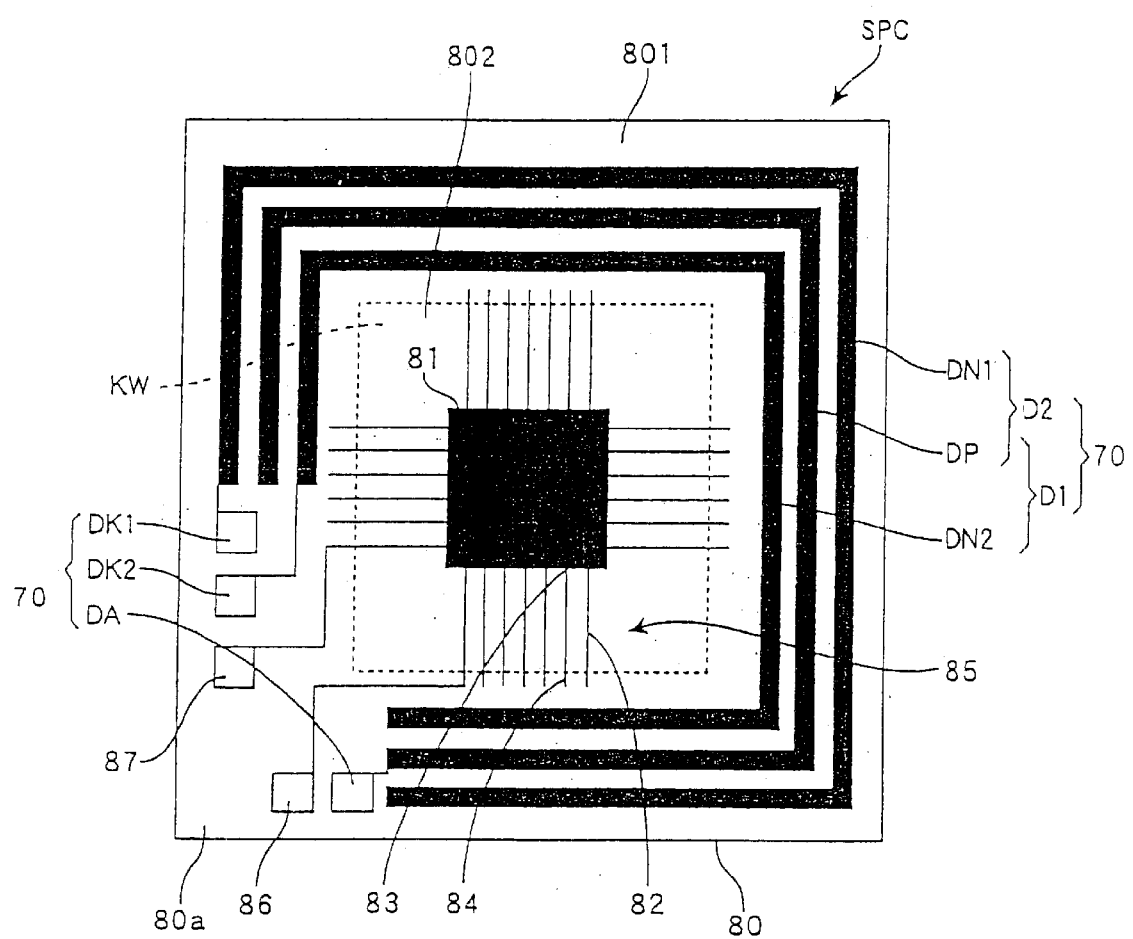
FIG. 11 is a plan view showing a modified example of a diode formed in an infrared sensing element.
Figure 12:
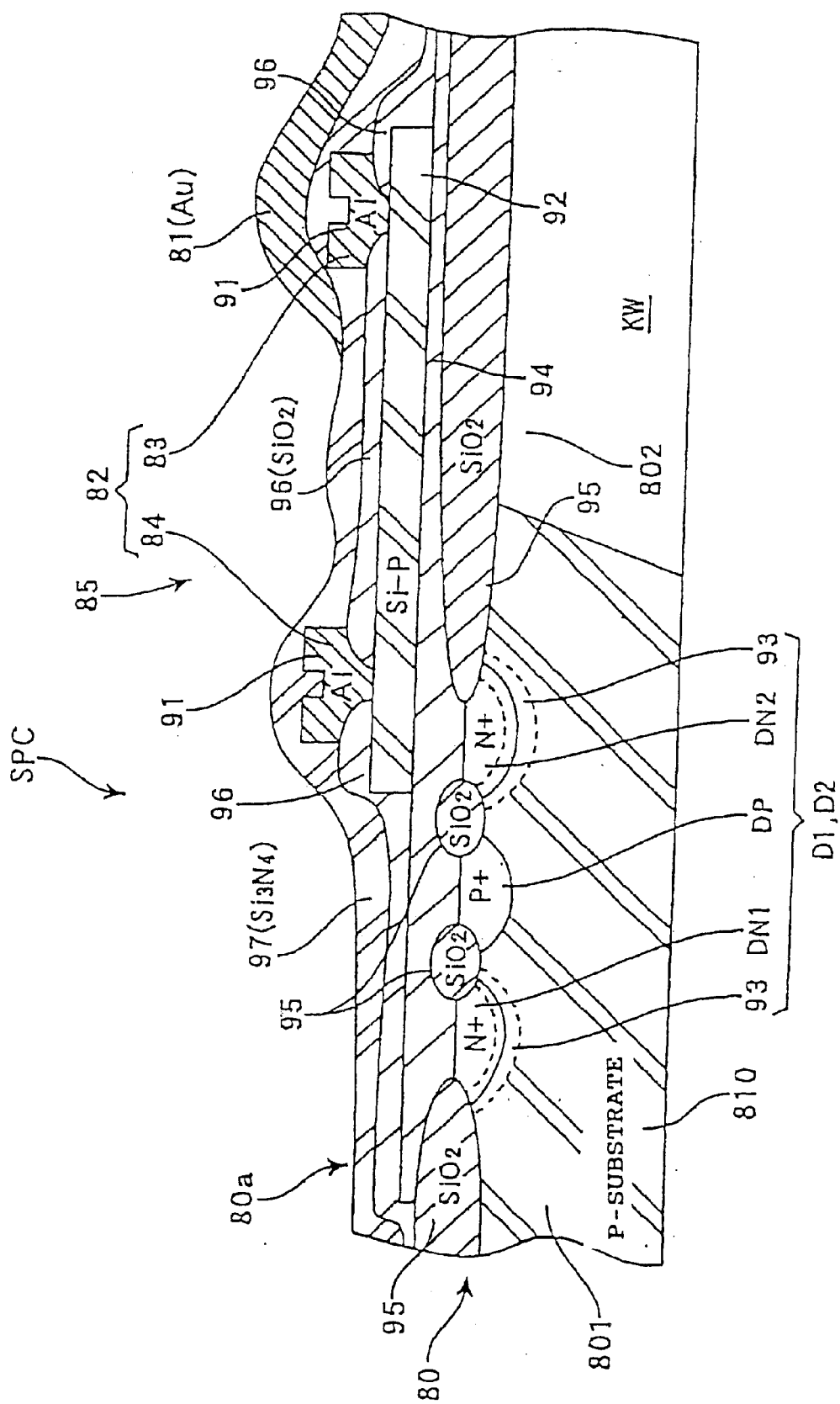
FIG. 12 is a sectional view of the diode shown in FIG. 11.

Although one embodiment of the present invention is described above, the present invention is not limited to the above embodiment, and various modifications may be made. For example, in a modification of the diodes D1 and D2 formed on the semiconductor substrate 810, which is also the substrate of the base 80, arrangement of the P+ region DP and the N+ region DN can be freely changed. Although the two diodes D1 and D2 are arranged along the periphery of the main surface 80a opposite to each other with the infrared absorber 81 formed therebetween, the diodes D1 and D2 may be formed in parallel along the periphery of the main surface 80a, as shown in a plan view of FIG. 11. A partial cross-sectional view of the structure of FIG. 11 is shown in FIG. 12. In this case, a common conductor layer may be used as the conductor layers of one side, which constitute the two diodes D1 and D2. In FIG. 12 the N+ region DN1 and N+ region DN2 are formed with the P+ region DP provided therebetween so that the three conductor regions form the two diodes D1 and D2.

In this way, the diodes D1 and D2 are arranged in parallel along the periphery of the main surface 80a so that the diodes D1 and D2 can be arranged along a plurality of cold junctions 84 of the thermopile 85. Therefore, an average temperature of the cold junctions 84 can be determined as the reference temperature Tr. Furthermore, the arrangement of the diodes D1 and D2 is not limited to this, and an appropriate arrangement can be selected in view of temperature characteristics and the yield of manufacture of the thermopile chip. As to the arrangement of the electrodes DK and DA, a different arrangement can be used in view of ease of handling of wiring and distribution of terminals, etc.

Also, the number of the diodes formed on the thermopile chip SPC is not limited to two, and the number may be one as described above. The number may also be three or more. However, it is preferred that at least two diodes be arranged to determine the difference between forward voltage drops, whereby the reference temperature Tr can be measured with higher accuracy, as explained above. In addition, the reference temperature may be determined based on the average of the forward voltages VF of a plurality of diodes so that data processing is performed to cancel a difference in the formation positions of the diodes, a difference in characteristics or environments, and a deviation from the theoretical value or design value.

Furthermore, in order to accurately measure the reference temperature of the cold junctions 84 of the thermopile 85, the diodes D1 and D2 may be formed on the semiconductor substrate 810 directly below the cold junctions 84, thereby greatly decreasing temperature measurement error due to the distance from the cold junctions to the diodes, which establish the reference temperature and avoid a large environmental temperature difference.

However, the diodes D1 and D2 may be formed not only on the silicon substrate 810 but may also be formed on the junction of the binary lens BL joined to the base 80 or on another semiconductor substrate superimposed on the silicon substrate 810. That is, in the above example of the infrared sensing element 21, the binary lens BL is joined to the surface of the thermopile chip SPC to form the infrared sensing chip as a unit, but the diodes D1 and D2 may be formed on a substrate other than substrate 810, such as the binary lens BL, or other substrate, and joined to the base 80. Irrespective of on what substrate the diodes are constructed, it is preferable that the diode position satisfies the conditions that they be near the junction between the binary lens BL and the thermopile chip SPC and near the cold junctions as the principal temperature reference point. In this manner, the reference temperature can still be measured with the thermosensitive portion in contact with the base 80.

Figure 13A:
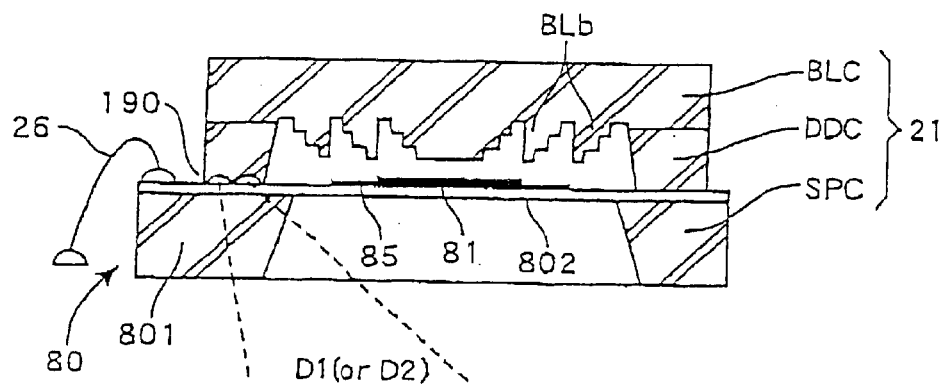
FIG. 13 is a drawing showing another example of an infrared sensing element in accord with the present invention.

FIG. 13(a) shows an example of an alternate infrared sensing element 21 in accord with the present invention wherein diodes D1 and D2 are formed on the binary lens BL side, and not on the thermopile chip SPC. In this way, even if the diodes are not formed on the thermopile chip SPC, the diodes D1 and D2 can still be arranged in contact with the base 80 on which the thermopile 85 is formed, as long as the diodes are provided on a member joined to the thermopile chip SPC, such as the binary lens BL. In the present alternate embodiment, the diodes are connected to the thick wall portion 801, which serves as the heat sink since it is constructed of a thermal conducting material such as a silicon-based or germanium-based semiconductor material or metal material, and do not measure temperature in an indirect manner where air is present between the diodes and the base 80.

Figure 13B:
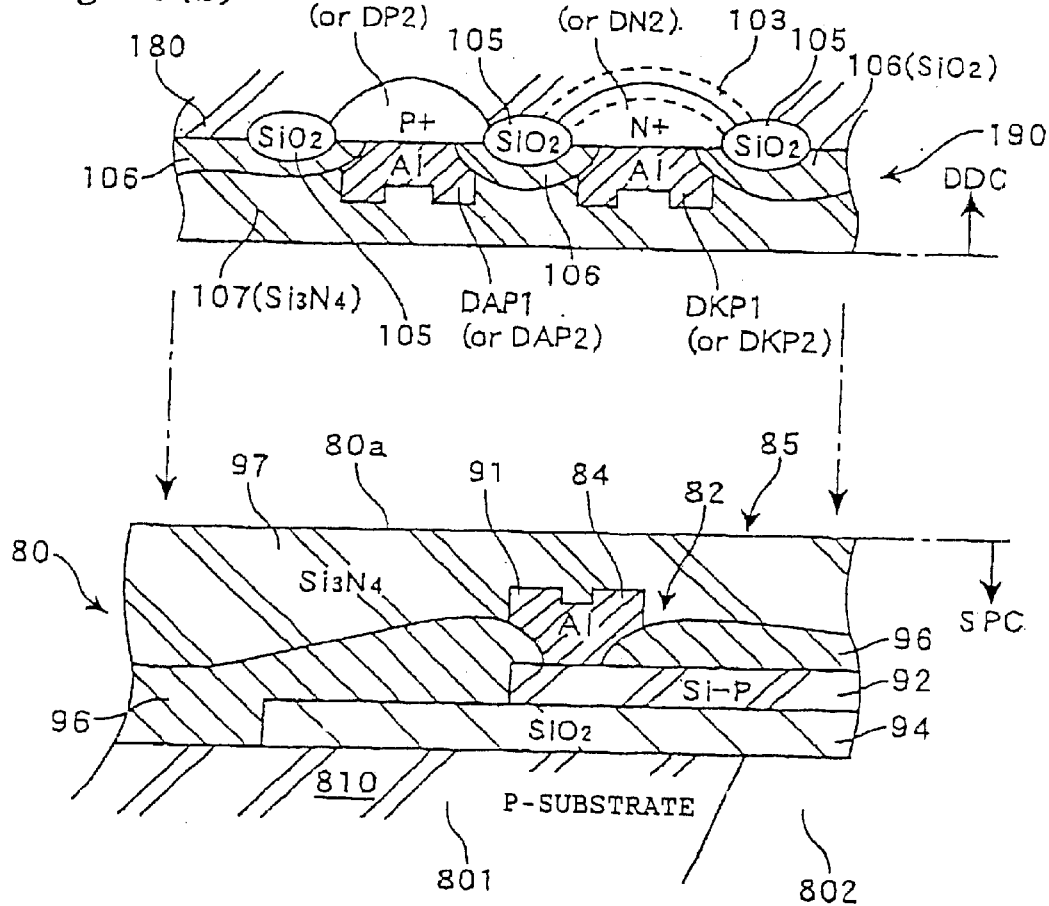

Furthermore, in the present embodiment of an infrared sensing element 21 shown in FIG. 13(a), the binary lens BL is preferably divided into a diode chip DDC and a binary lens chip BLC which are laminated in the shown order on the thick wall portion 801 of the thermopile chip SPC. The diodes D1 and D2 are formed on the diode chip DDC at the junction 190 with the thermopile chip SPC. Even if the binary lens BL were not divided into a lens chip BLC and a diode chip DDC, the diodes D1 and D2 would be formed on the binary lens BL at the junction with the thermopile chip SPC, and the junction may still be joined to the thick wall portion of the base 80 for detecting the reference temperature. However, in consideration of the fact that the multi-step shape of the binary lens BL is formed by etching, the binary lens BL is preferably divided into the lens chip BLC and the diode chip DDC, as shown in FIGS. 13a–13b, to separate the manufacturing steps and thereby simplify the manufacturing processes and improve yield. Furthermore, the measure of adding zinc sulfide (ZnS) and germanium (Ge) to the composition of the lens chip BLC can give it the function of an infrared filter for cutting off visible. Also, the wavelength region can be narrowed by an infrared coating comprising a multilayer film of zinc sulfide and germanium. In addition, a binary element BLb having a multi-step structure may be formed to facilitate formation of lenses with the same light collecting accuracy, as compared with general lenses which have a curved surface.

In this way, the binary lens chip BLC, the diode chip DDC and the thermopile chip SPC, which constitute the infrared sensing element, can be formed by a semiconductor manufacturing process such as etching or the like using a silicon or germanium semiconductor substrate.

Referring to the diode chip DDC, as shown in FIG. 13(b), an oxide film 105 is first formed on the surface (the intermediate surface covered by a nitride film 107 in the drawing) of a silicon substrate 180, which constitutes the diode chip DDC. The oxide film 105 is patterned and selective regions of substrate 180 are doped with ions to form the P+ regions DP1 and DP2 and the N+ regions DN1 and DN2 which constitute the diodes D1 and D2, respectively. Thereafter, an oxide film 106 is formed, and an aluminum metal layer of diode anode patterns DAP1 and DAP2 and diode cathode patterns DKP1 and DKP2 is formed. Furthermore, a thin film layer comprising a nitride film 107 for protecting the surface of substrate 180 is formed, and at the same time, anode terminals DAT are formed.

In the thus-formed diodes D1 and D2, the P+ regions DP1 and DP2 and the N+ regions DN1 and DN2 are preferably arranged so that at the junction 190 of the diode chip DDC, the PN junction region 103 is located directly adjacent, i.e. below, the cold junctions 84 of the thermopile 85 when the diode chip DDC is joined to the thermopile chip SPC. Therefore, in joining the diode chip DDC and the thermopile chip SPC together, the diodes D1 and D2 serving as the thermosensitive portions are arranged in contact with the cold junctions 84, which serve as the principal reference point for sensing the reference temperature, whereby the reference temperature of the cold junctions 84 directly below the diodes, or the vicinity thereof, can be measured with high accuracy.

Figure 14:
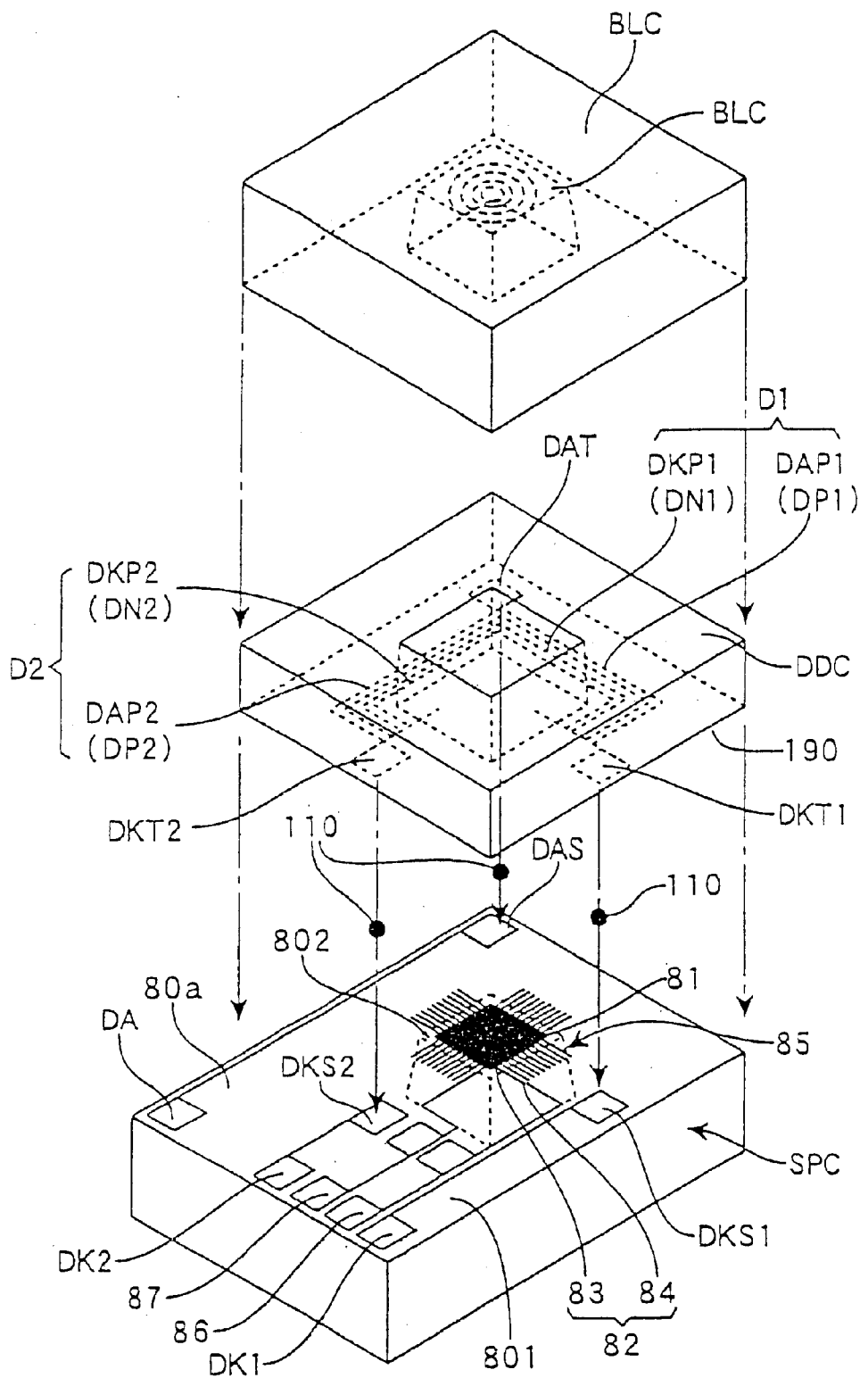
FIG. 14 is a drawing showing an example of the method of assembling the infrared sensing element shown in FIG. 13.

As shown in an exploded view drawing of FIG. 14, the diode chip DDC is formed by a substrate having a central opening formed to permit the passage of infrared radiation to the central infrared absorber 81 of the thermopile chip SPC, such that the junction 190 of DDC with the thermopile chip SPC has a square shape. Alternatively, the junction may be made round in which case it would have a ring shape. At the junction 190, the two diodes D1 and D2 are formed to extend along the ring junction 190. Specifically, the diode cathode pattern DKP1 connected to the cathode terminal DKT1, the corresponding N+ region DN1, the diode cathode pattern DKP2 connected to the cathode terminal DKT2, and the corresponding N+ region DN2 are formed in substantially a square shape. The diode anode pattern DAP1 connected to the common anode terminal DAT and extending in one of the two directions, the corresponding P+ region DP1, the diode anode pattern DAP2 connected to the above-described anode terminal DAT and extending in the other of the two directions, the corresponding P+ region DP2 are also formed in substantially a square shape.

Figure 15A:
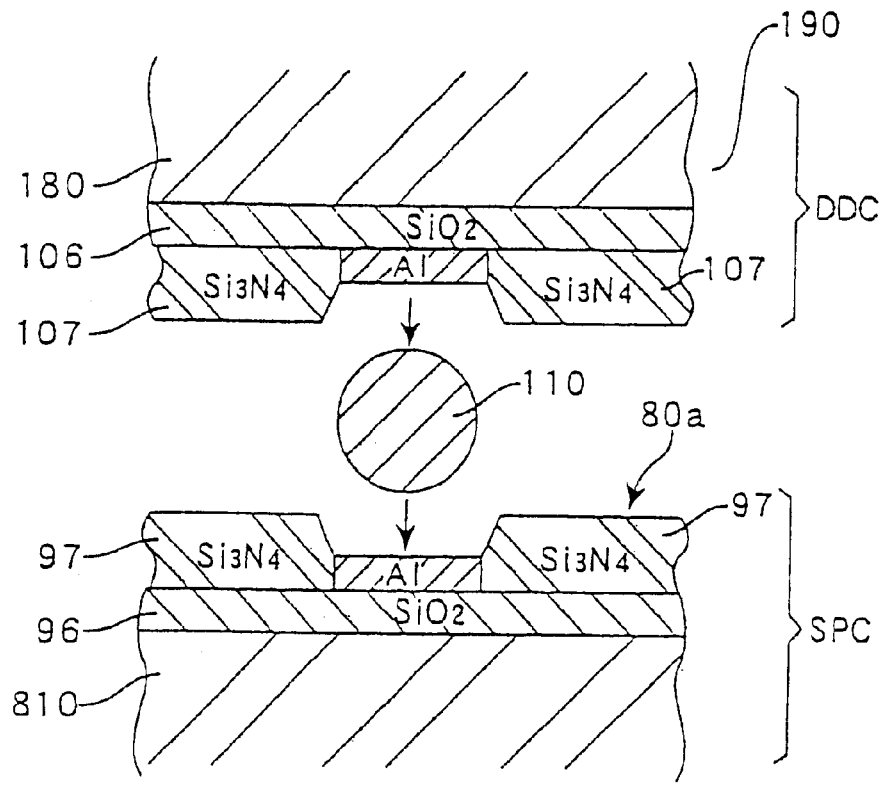
FIG. 15 is an enlarged view showing the junction shown in FIG. 14.
Figure 15B:
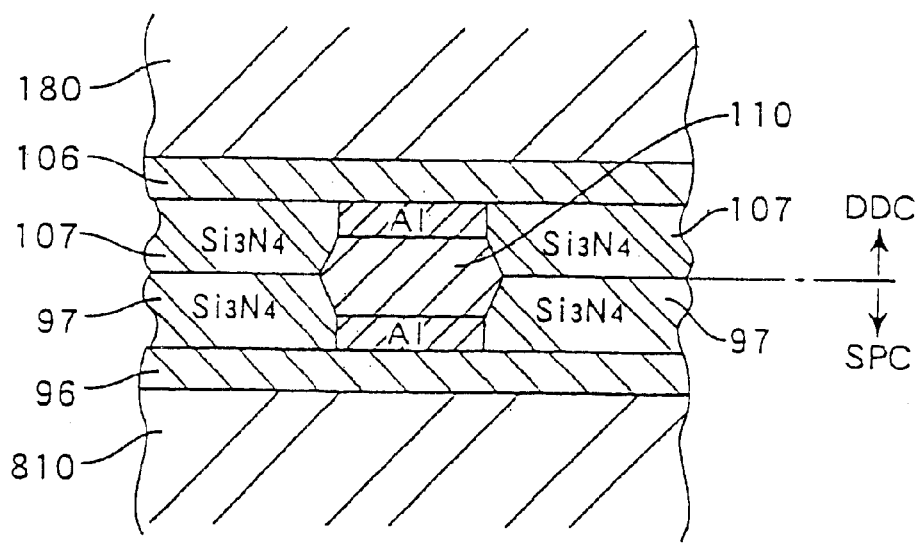

On the other hand, terminals DA, DK1 and DK2 are also provided on the thermopile chip SPC, which server as diode output terminals of the infrared sensing element 21 when the diode chip DDC is joined to the thermopile chip SPC. These terminals are connected, with aluminum wiring, to terminals DAS, DKS1 and DKS2, respectively, for connecting to the diode chip DDC. The connecting terminals DAS, DKS1 and DKS2 are arranged opposite to the terminals DAT, DKR1 and DKT2, respectively, of the diode chip DDC. Therefore, as shown in FIGS. 15(a) and (b), in joining together the diode chip DDC and the thermopile chip SPC, the connecting terminals DAS, DKS1 and DKS2 can be connected to the terminals DAT, DKT1 and DKT2, respectively, by inserting a soft metal of solder 110 between the aluminum layers which constitute opposite terminals. In the thermopile chip SPC, the output terminals DA, DK1 and DK2 are arranged in the region of the surface 80a of the base, which extends outside the junction region with the diode chip DDC, whereby the infrared sensing element 21 exhibiting ease of bonding can be provided.

Therefore, the diodes D1 and D2 are formed on the binary lens BL or the junction of another substrate joined directly to the thermopile chip SPC, thereby permitting arrangement of the diodes D1 and D2 in contact with the thick wall portion 801 serving as the heat sink of the thermopile chip SPC. Therefore, the temperature of the cold junctions 84 of the thermopile chip 85 can be detected as the reference temperature by using the diodes D1 and D2 as the thermosensitive portions, permitting temperature measurement with high accuracy. In addition, the diodes are arranged on a chip different from the thermopile chip SPC to save the space for arranging the diodes on the thermopile chip SPC, and thus the smaller infrared sensing element as a whole can be provided. The binary lens BL. the diode chip DDC and the thermopile chip SPC can be produced by using semiconductor manufacturing processes. Therefore, the configuration is suitable for mass production, and a compact infrared sensing element with high sensitivity can be provided at low cost.

Furthermore, the binary lens BL is joined to the thermopile chip SPC, or a combination of the binary lens chip BLC and the diode chip DDC is joined to the thermopile chip SPC, as in this embodiment, so that the temperature of the binary lens BL agrees with the temperature of the thick wall portion 801 serving as the heat sink to decrease the influence or interference of infrared radiation due to external heat. It is thus possible to decrease the factors of error to further improve the measurement accuracy. The junction between the binary lens serving as infrared lens and the thermopile chip can be used as the space for the thermosensitive portions, thereby making the element compact. At the same time, the temperature (equal to the reference temperature because of contact with the thermopile chip) on the binary lens BL side is also determined by the diodes D1 and D2, thereby decreasing the measurement error, decreasing the measurement error due to the temperature difference between the reference temperature and the lens temperature.

In the above-described embodiment, the substrate referred to as "the diode chip" for forming the diodes D1 and D2 is a junction substrate composed of semiconductor, and formed by processing for joining binary lens chip (lens substrate) BLC. Therefore, the shape of the diode chip is not limited to the above shape, and an appropriate shape coinciding with the shape of the lens chip and the shape of the thermopile chip can be formed so that the binary lend chip BLC having a shape suitable for the lens can be appropriately joined to the thermopile chip SPC having a shape suitable for an infrared sensor.

Although, in the above embodiment, the terminals are arranged together on one side of the thermopile chip SPC so that the bonding wire 26 can be led from one side, the terminals can be formed on both sides, or the thermopile chip SPC can be formed in a size larger than the binary lens BL (the binary lens chip BLC+diode chip DDC) so that the terminals can be distributed in the periphery of the chip to take out singles from all regions.

Figure 16:
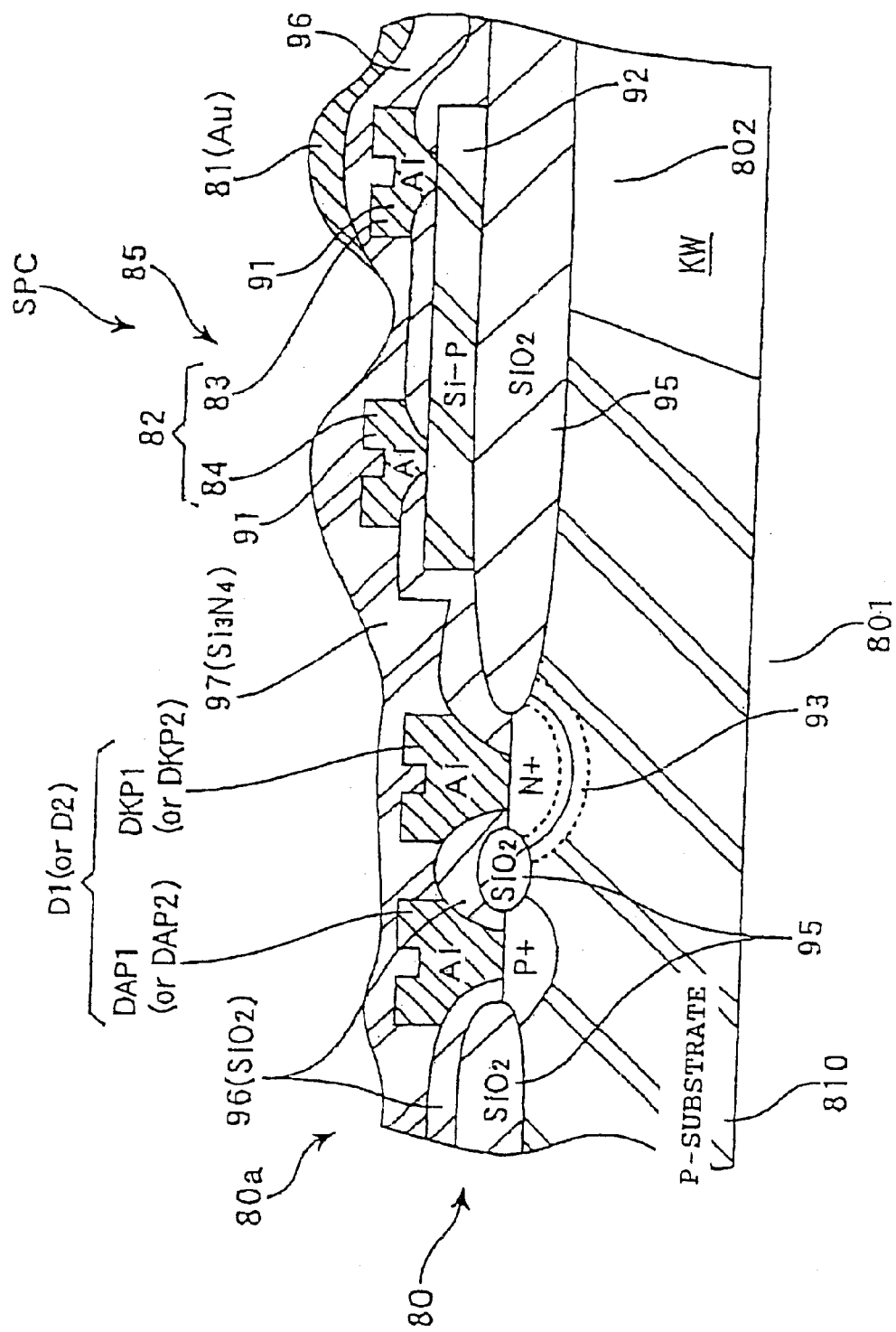
FIG. 16 is a sectional view showing an example in which an electrode is formed on a diode of an infrared sensing element.

Furthermore, in this embodiment, as shown in FIG. 16, the diode anode patterns DAP1 and DAP2 and the diode cathode patterns DKP1 and DKP2 are provided in contact with the P+ regions DP1 and DP2 and the N+ regions DN1 and DN2, which are diode conductor regions, to remove a potential difference between positions where the potentials should be the same as a diode, thereby securing an accurate operation. If there is no problem of performance and operation, the P+ regions DP1 and DP2 and the N+ regions DN1 and DN2 can be connected directly to the terminals DAT, DKT1 and DKR2 to omit the patterns DAP1, DAP2, DKP1 and DKP2, etc. However, with the diodes arranged in a ring shape, the conductor region is lengthened, and thus, like in this embodiment, the patterns are preferably provided to prevent the occurrence of a potential difference.

This applies to the case in which the diodes D1 and D2 are formed on the thermopile chip SPC. As shown in FIG. 1, the diode anode patterns DAP1 and DAP2 and diode cathode patterns DKP1 and DKP2 are provided on the thermopile chip SPC to remove a potential difference between positions where the potentials should be the same as a diode, thereby securing an accurate operation. In this case, the diodes cannot be easily formed directly below the cold junctions 84, but the diodes D1 and D2 can be arranged sufficiently near the cold junctions 84, whereby the reference temperature can be measured with the same or higher accuracy as, or than, the above alternate embodiment.

Furthermore, as the material of the conductor for forming the thermocouples 82, a material having low resistivity and low thermal conductivity is preferred. Therefore, a semiconductor from which a material with low resistivity and low thermal conductivity can be obtained is frequently used, as compared with a metal which has low resistivity but is liable to increase in thermal conductivity. Namely, it is possible to use a semiconductor material having an absolute thermoelectric ability (i.e. Seebeck coefficient) of ten times as high as an ordinary metal, the thermoelectric ability representing thermoelectric force per unit temperature. Therefore, in the above embodiment, as one of the conductors which form each of the thermocouples 82, polysilicon doped with V-group element phosphorus P as a donor impurity is used. Therefore, the polysilicon is an n-type semiconductor, but it can be changed to a semiconductor material having lower resistivity and lower thermal conductivity. For example, a p-type semiconductor doped with a III-group element as an acceptor impurity can be used as the conductor for the thermocouples 82. As the other conductor of each of the thermocouples 82, aluminum, (phosphorus-dope) polysilicon, molybdenum silicide, titanium nitride, tungsten silicide, or the like can be used.

Although the other conductor of each thermocouple 82 comprises an aluminum metal, each of the thermocouples 82 may be made of a combination of p-type semiconductor and n-type semiconductor. In this case, since the Seebeck coefficients of the p-type semiconductor and n-type semiconductor have opposite polarities, the p-type semiconductor and n-type semiconductor can be alternately connected in series to form a thermopile. Also, a metal having lower resistivity can be used only in the portions corresponding to the hot junctions and cold junctions.

In general, in consideration of the coefficient of the thermopile, the performance coefficient, Peltier coefficient, Thomson coefficient of each material used for the thermopile, etc. based on the Kelvin relationship and the efficiency equation of Carnot cycle, etc., a high efficiency can be attained, and the sensitivity of the thermopile can be improved. Even in use of a metal for one or both conductors, the spaces between the hot junctions and cold junctions can be relayed with a metal or a semiconductor having low thermal conductivity to improve measurement sensitivity.

As described above and shown in FIGS. 17 and 18, slits are effective to improve the sensitivity of the thermocouples 82 or the thermopile 85. Therefore, in the infrared sensing element 21, the slit 98 is provided between one of the conductors of each thermocouple 82, for example, the other conductor of the thermocouple 82 adjacent to an aluminum electrodes 91, and a polysilicon electrode 92. As a result, the thermal conduction between the hot junctions 83 and cold junctions 84 can be decreased to secure the large temperature difference between both junctions, thereby increasing the electromotive force produced in each of the thermocouples 82. Therefore, even when the distance between the hot junctions and cold junctions is decreased to make the element compact, the infrared sensing element 21 having high sensitivity can be provided. It is thus preferable to wide the slits 98. However, since the distance between the respective conductors must be increased, it is difficult to compactly arrange many thermocouples, possibly increasing the chip area.

Figure 17:
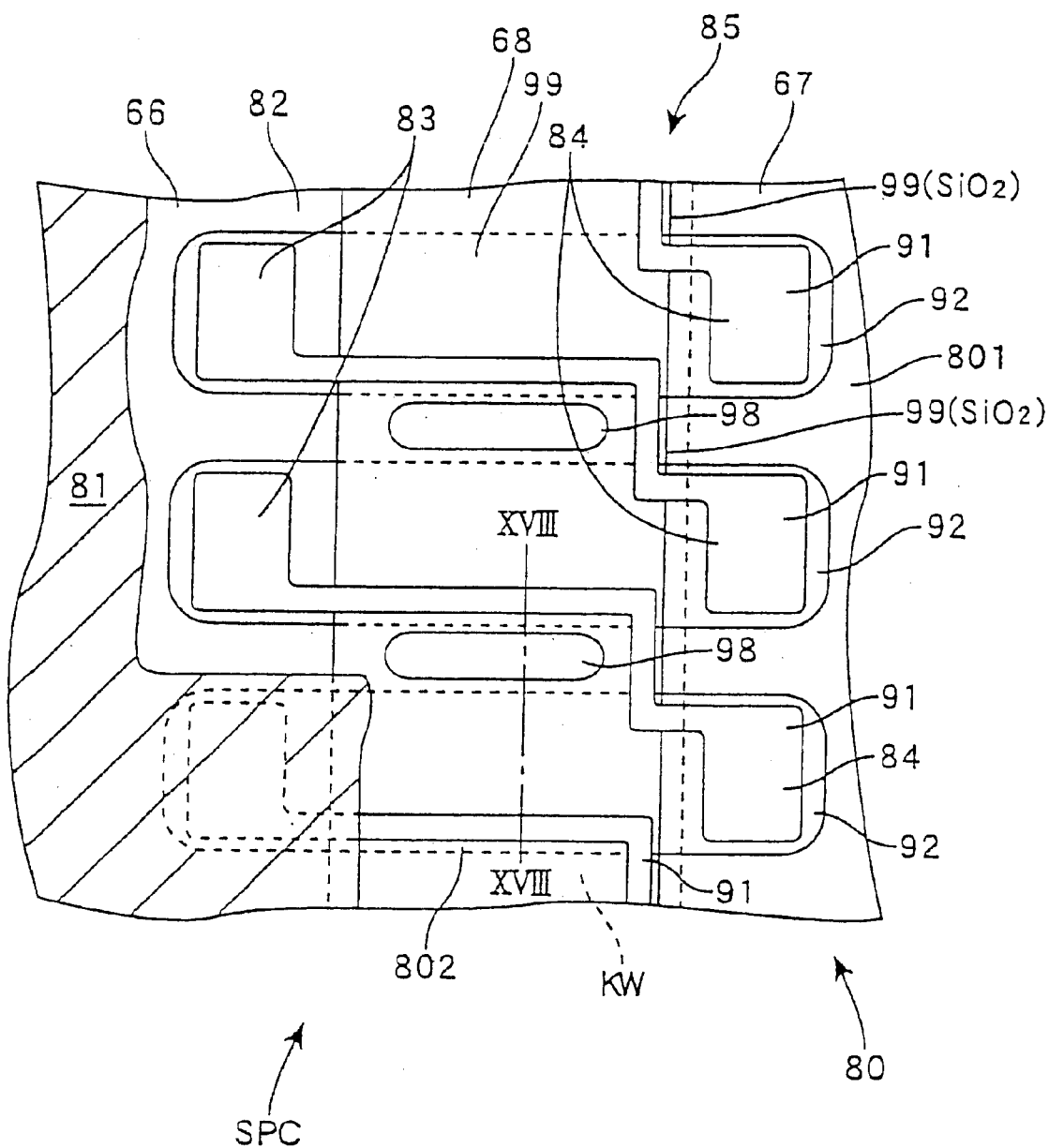
FIG. 17 is a plan view showing a modified example of slits.
Figure 18:
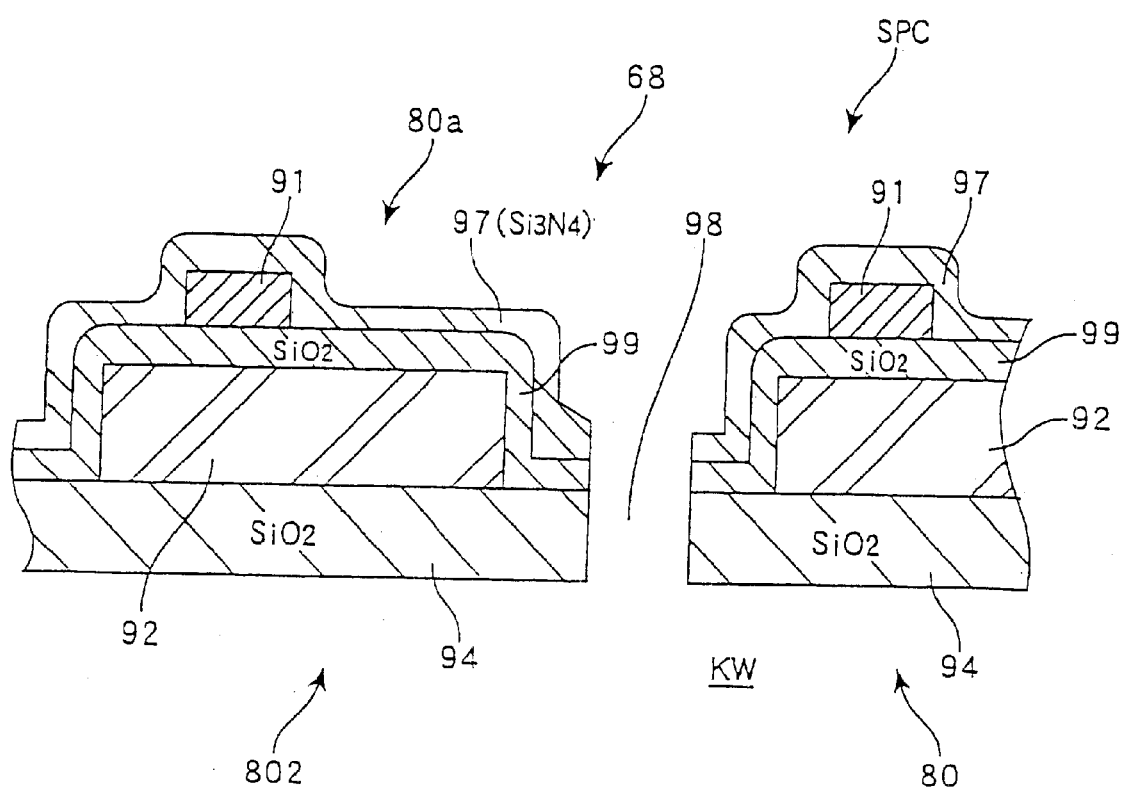
FIG. 18 is a partial cross-sectional view along line XVIII—XVIII of FIG. 17.

On the other hand, as shown in an enlarged view of FIG. 17 and a partial sectional view of FIG. 18, in the intermediate supporting region 68 of the thin film portion 802, an oxide film 99 may be provided on the polysilicon layer 91, which is one of the conductors of each thermocouple 82, and the aluminum layer 92, which is the other conductor, is formed on the oxide film 99 to be overlapped with the conductor 91. This can decrease the planar space occupied by the conductors 91 and 92, and thus permit the formation of the wide slits 98 between the conductors 91 and 92. Furthermore, by overlapping the conductors 91 and 92, the packing density of the thermocouples 82 can be further increased. Therefore, the size of the slits 98 can be further increased to improve measurement sensitivity without a change in the total surface area of the chip.

Figure 19:
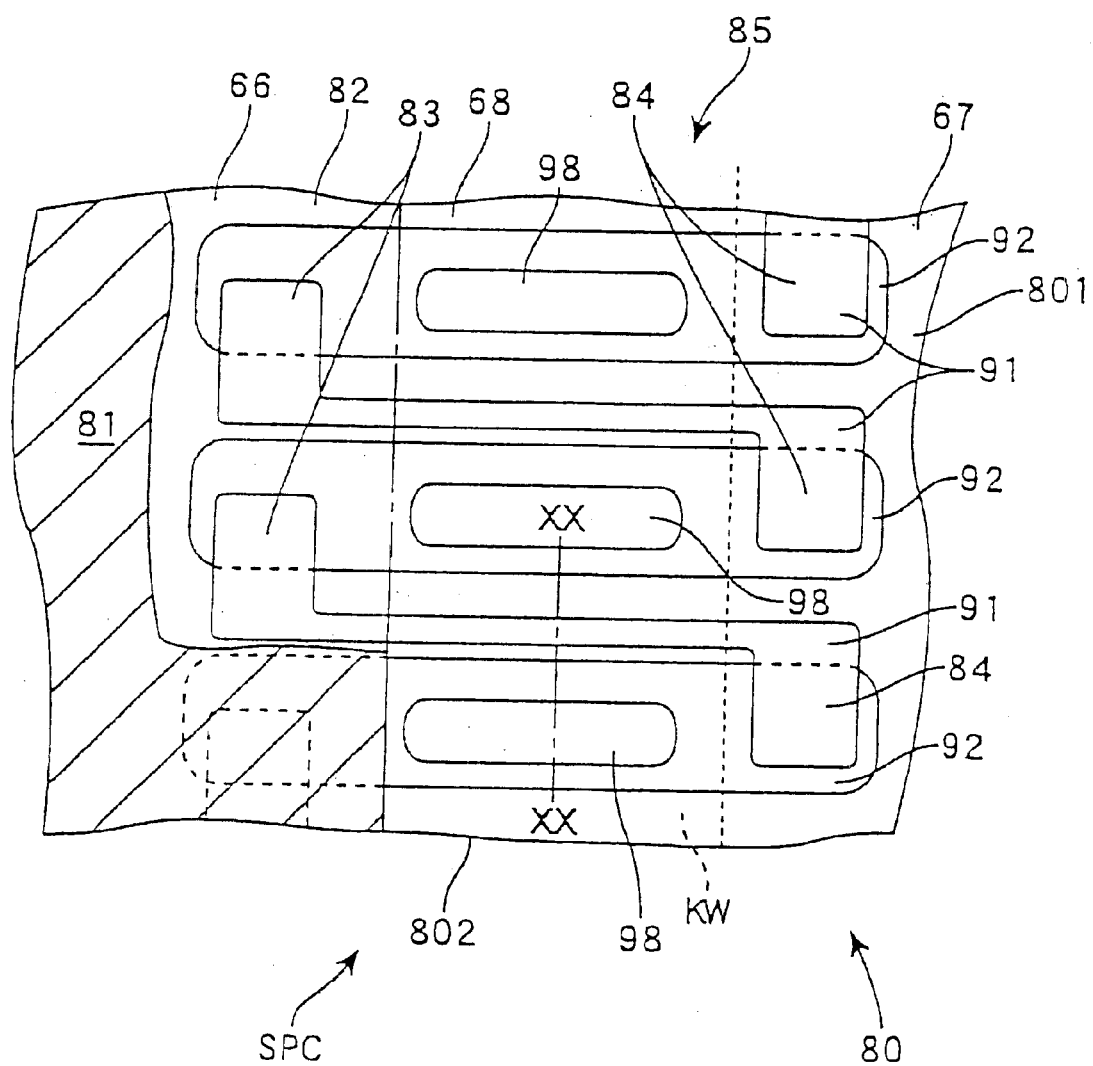
FIG. 19 is a plan view showing another modified example of slits.
Figure 20:
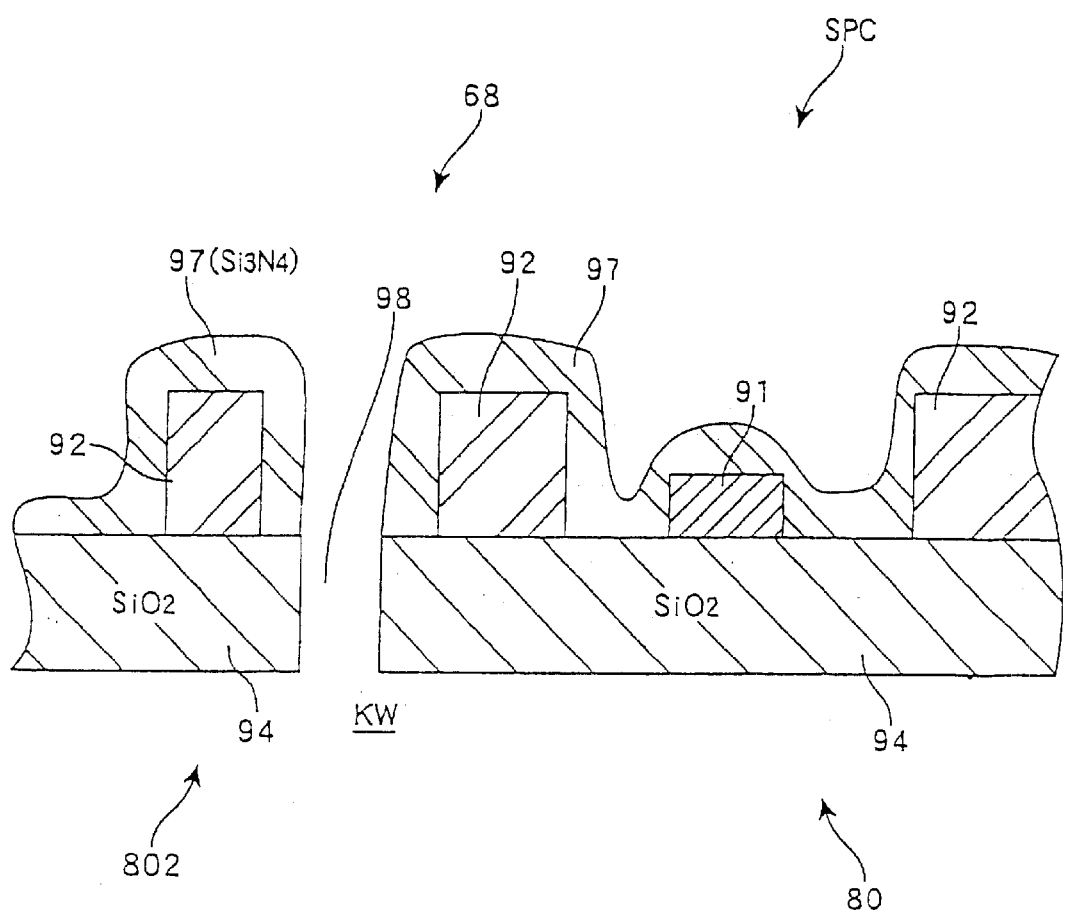
FIG. 20 is a partial cross-sectional view along line XX—XX of FIG. 19.

As shown in an enlarged view of FIG. 19 and a partial cross-sectional view of FIG. 20, in the intermediate supporting region 68 of the thin film portion 802, the slit 98 may be provided within the width of one or both of the conductors which constitute each thermocouple. In the example shown in FIGS. 19 and 20, in the intermediate supporting region 68, the slit 98 is provided in the polysilicon layer 92 of each thermocouple 82 so as to continue from the surface of the polysilicon layer 92 to the hollow portion KW, thereby decreasing the sectional area of the conductors. It is thus possible to decrease the amount of the heat transmitted through the conductors 92, and thus increase the sensitivity of the thermocouples. In this case, the packing density of the thermocouples 82 is not decreased.

Although, in the above-described examples, the slits are formed in the thin film portion 802, the holes are not limited to the slits. In addition, the holes do not necessarily pass through the thin film portion 802 to reach the hollow portion KW, and a recess may be formed in a portion of the thin film portion 802 or the conductor 92 or 91 which constitutes each of the thermocouples 82 to decrease the sectional area between the hot junction and cold junction, thereby decreasing the amount of heat conduction to improve sensitivity.

Although, in this embodiment, the present invention is described with respect to the thermopile chip SPC comprising the infrared absorber 81 as an example, the thin film portion 802 formed by the hollow portion KW permits achievement of a sensor with sufficiently high sensitivity to infrared radiation. The silicon substrate 810 remaining unetched in the thin wall portion 801 functions as the heat sink. Therefore, even when the infrared absorber 81 is not formed on the thin film portion 802, the present invention can provide an infrared sensing element with sufficiently high sensitivity, which can be used as a clinical thermometer or the like. In an infrared sensing element comprising the infrared absorber 81 provided on the thin film portion 802, the infrared absorber 81 absorbs infrared radiation to increase temperature, and thus the temperature difference between the thin film portion 802 and the thick wall portion 801 can be increased, thereby increasing the output voltage of the thermopile 85 and further improving measurement sensitivity.

Furthermore, the ear-type clinical thermometer is described as an example of the temperature measuring device using the infrared sensing element 21 of the present invention. However, of course, the present invention can be applied to not only other types of clinical thermometers in which the temperature of a heat source is measured by using infrared radiation from the heat source, but also temperature measuring devices for other applications. The measured temperature can be used by various methods, and, for example, the measured temperature can be displayed or used for performing various controls. Therefore, the present invention is not limited to temperature measuring devices having only the function to measure temperatures, and the present invention includes devices having a combination with another function, for example, a control function. Furthermore, the above-described embodiment is only an example of the present invention, and an appropriate change can be made within the scope of the gist of the prevent invention.

What is claimed is:

1. An infrared sensing element comprising:
   a base including a thin film portion and a thick wall portion provided around said thin film portion;
   a thermopile including a plurality of thermocouples formed so that cold junctions are located on said thick wall portion and hot junctions are located on said thin film portion; and
   a reference temperature sensing element including a thermosensitive section in contact with said thick wall portion;
   wherein at least part of said thick wall portion of said base is made of a semiconductor substrate, and wherein said thermosensitive section includes a plurality of PN junctions formed on said semiconductor substrate.

2. An infrared sensing element according to claim 1, wherein said plurality of PN junctions are arranged in parallel.

3. An infrared sensing element according to claim 2, wherein a common conductor is used as a conductor layer for one side of said plurality of PN junctions.

4. An infrared sensing element according to claim 1, wherein said PN junctions is formed along the periphery of said thin film portion.

5. An infrared sensing element according to claim 4, wherein said PN junction includes first and second conduction layers; and
   said infrared sensing element further includes an electrode formed on, and extending along, the upper surface of each of said first and second conductor layers.

6. An infrared sensing element comprising:
   a base including a thin film portion and a thick wall portion provided around said thin film portion;
   a thermopile including a plurality of thermocouples formed so that cold junctions are located on said thick wall portion and hot junctions are located on said thin film portion; and
   a reference temperature sensing element including a thermosensitive section in contact with said thick wall portion;
   wherein at least part of said thick wall portion of said base is made of a semiconductor substrate, and wherein said thermosensitive section includes a PN junction formed on said semiconductor substrate, wherein said PN junction is formed vertically adjacent to each of said cold junctions.

7. An infrared sensing element comprising:
   a base including a thin film portion and a thick wall portion provided around said thin film portion;
   a thermopile including a plurality of thermocouples formed so that cold junctions are located on said thick wall portion and hot junctions are located on said thin film portion;
   a reference temperature sensing element including a thermosensitive section in contact with said thick wall portion; and
   a substrate module joined to the top of said thick wall portion of said base, said thermosensitive section being a part of at least one of said base and said substrate module and being located at the junction between said base and said substrate module;
   wherein said substrate module is a semiconductor substrate, and said thermosensitive section includes a PN junction formed on said substrate module.

8. An infrared sensing element according to claim 7, wherein said thermosensitive section includes a plurality of said PN junctions.

9. An infrared sensing element according to claim 8, wherein said plurality of PN junctions are arranged in parallel.

10. An infrared sensing element according to claim 9, wherein a common conductor is used as a conductor layer for one side of said plurality of PN junctions.

11. An infrared sensing element according to claim 7, wherein said PN junction is formed vertically adjacent each of the cold junctions.

12. An infrared sensing element according to claim 7, wherein said PN junction is formed along the junction between said base and said substrate module.

13. An infrared sensing element according to claim 12, wherein said PN junction includes first and second conduction layers; and
    said infrared sensing element further includes an electrode formed in contact with, and extending along, the upper surface of each of said first and second conductor layers.

14. An infrared sensing element comprising:
    a base including a thin film portion and a thick wall portion provided around said thin film portion;
    a thermopile including a plurality of thermocouples formed so that cold junctions are located on said thick wall portion and hot junctions are located on said thin film portion;
    a reference temperature sensing element including a thermosensitive section in contact with said thick wall portion; and
    an infrared lens provided on said thin film portion so that infrared radiation can be collected on the thin film portion, wherein:
       said infrared lens is joined to said thick wall portion of said base;
       said infrared lens is formed by etching a semiconductor substrate; and
       said thermosensitive section includes a plurality of PN junctions formed at the junction between said infrared lens and said base.

15. An infrared sensing element according to claim 14, wherein said plurality of PN junctions are arranged in parallel.

16. An infrared sensing element according to claim 15, wherein a common conductor is used as a conductor layer for one side in said plurality of PN junctions.

17. An infrared sensing element comprising:
    a base including a thin film portion and a thick wall portion provided around said thin film portion;
    a thermopile including a plurality of thermocouples formed so that cold junctions are located on said thick wall portion and hot junctions are located on said thin film portion;
    a reference temperature sensing element including a thermosensitive section in contact with said thick wall portion; and
    an infrared lens provided on said thin film portion so that infrared radiation can be collected on the thin film portion, wherein said infrared lens is joined to said thick wall portion of said base, and said infrared lens is formed by etching a semiconductor substrate, and
    wherein said thermosensitive section includes a PN junction formed at the junction between said infrared lens and said base, said PN junction is located vertically adjacent to each of said cold junctions.

18. An infrared sensing element according to claim 17, wherein the junction between said infrared lens and said base runs along the periphery of said thin film portion, and said PN junction is formed along said periphery.

19. An infrared sensing element according to claim 18, wherein said PN junction includes first and second conduction layers; and
    said infrared sensing element further includes an electrode formed in contact with, and extending along, the upper surface of each of said first and second conductor layers.

20. An infrared sensing element comprising:
    a base including a thin film portion and a thick wall portion provided around said thin film portion;
    a thermopile including a plurality of thermocouples formed so that cold junctions are located on said thick wall portion and hot junctions are located on said thin film portion; and a reference temperature sensing element including a thermosensitive section in contact with said thick wall portion wherein the conductors of said thermocouples have thinned portions, and said infrared sensing element further has slits forming opening through at least one of the conductors of each of the thermocouples and said thinned portions.

21. A temperature measuring device comprising:

an infrared sensing element having a base including a thin film portion and a thick wall portion provided around said thin film portion, having a thermopile including a plurality of thermocouples formed so that cold junctions are located on said thick wall portion and hot junctions are located on said thin film portion; and having a reference temperature sensing element including a thermosensitive section in contact with said thick wall portion, wherein said thermosensitive section serves as a reference temperature sensing element; and a processing device for determining temperature from an output voltage of said thermopile based on a reference temperature determined by output from said reference temperature sensing element wherein said thermosensitive section includes a plurality of PN junctions, and said processing device is further effective for determining said reference temperature from a difference between the forward voltage drops of said plurality of PN junctions.

22. A temperature measuring device according to claim 21, further comprising a cylindrical portion with a front end which can be inserted into a lughole, wherein said thin film portion of said infrared sensing element is arranged to face the front end of said cylindrical portion.

23. A temperature measuring device according to claim 22, wherein said infrared sensing element includes an infrared absorber laminated on said thin film portion to cover at least said hot junctions or the vicinities thereof so that said infrared absorber faces the front end of said cylindrical portion.

* * * * *